(12) United States Patent
Schroder et al.

(10) Patent No.: US 12,223,515 B2
(45) Date of Patent: Feb. 11, 2025

(54) CARBON EMISSION OPTIMIZATION FOR DEVICE LIFECYCLE MANAGEMENT

(71) Applicant: ASSURANT, INC., New York, NY (US)

(72) Inventors: Marc Schroder, Crewe (GB); Patrick Ross, Bonn (DE)

(73) Assignee: ASSURANT, INC., New York, NY (US)

( * ) Notice: Subject to any disclaimer, the term of this patent is extended or adjusted under 35 U.S.C. 154(b) by 0 days.

(21) Appl. No.: 18/348,889

(22) Filed: Jul. 7, 2023

(65) Prior Publication Data

US 2024/0289814 A1 Aug. 29, 2024

Related U.S. Application Data

(60) Provisional application No. 63/487,002, filed on Feb. 26, 2023.

(51) Int. Cl.
| | |
|---|---|
| *G06Q 30/018* | (2023.01) |
| *G06Q 10/20* | (2023.01) |
| *G06Q 10/30* | (2023.01) |
| *G06T 7/00* | (2017.01) |

(52) U.S. Cl.
CPC ........... *G06Q 30/018* (2013.01); *G06Q 10/20* (2013.01); *G06T 7/0004* (2013.01); *G06Q 10/30* (2013.01)

(58) Field of Classification Search
None
See application file for complete search history.

(56) References Cited

U.S. PATENT DOCUMENTS

| | | |
|---|---|---|
| 9,413,893 B2 | 8/2016 | Hurst et al. |
| 9,483,344 B2 | 11/2016 | Hurst et al. |
| 10,073,754 B2 | 9/2018 | Brewer et al. |

(Continued)

FOREIGN PATENT DOCUMENTS

| | | | | |
|---|---|---|---|---|
| EP | 2244218 A1 | * | 10/2010 | ............. G06Q 10/06 |
| JP | 2005135092 A | * | 5/2005 | ............. G06Q 10/06 |

OTHER PUBLICATIONS

ISA/220—Notification of Transmittal or Search Report and Written Opinion of the ISA, or the Declaration Mailed on Dec. 19, 2023 for WO Application No. PCT/US23/074502, 138 page(s).

*Primary Examiner* — Jan P Mincarelli
(74) *Attorney, Agent, or Firm* — Alston & Bird LLP

(57) ABSTRACT

Various embodiments are directed to apparatuses, methods, computer readable media, computer program products, and systems related to optimizing carbon emission in mobile device lifecycle operations, including by programmatically determining and executing carbon efficient mobile device repairs. In some embodiments, the system may be configured for carbon optimized repair of a plurality of mobile devices. The system may connect with the mobile device; receive device data from the mobile device, the device data including a device identifier. The system may diagnose at least one defect with the mobile device; identify a plurality of solutions for the at least one defect; apply the device identifier and information associated with the at least one defect to one or more models to generate lifecycle efficiency prediction data for the mobile device for the plurality of solutions; and select a carbon minimized solution of the plurality of solutions based on the lifecycle efficiency predictions.

20 Claims, 15 Drawing Sheets

(56) References Cited

U.S. PATENT DOCUMENTS

| | | |
|---|---|---|
| 10,332,249 B2 | 6/2019 | Dwivedi et al. |
| 11,580,627 B2 | 2/2023 | Johnson et al. |
| 2010/0228676 A1 | 9/2010 | Librizzi et al. |
| 2012/0252403 A1 | 10/2012 | Becerra et al. |
| 2015/0206200 A1* | 7/2015 | Edmondson ....... G06Q 30/0201 |
| | | 705/306 |
| 2020/0042920 A1 | 2/2020 | Moorthy et al. |
| 2021/0081712 A1* | 3/2021 | Saunders ............... G06V 20/95 |
| 2021/0248618 A1 | 8/2021 | Ionescu et al. |
| 2023/0376870 A1* | 11/2023 | Hildebrand ...... G06Q 10/06316 |
| 2023/0412605 A1 | 12/2023 | Maladwalla et al. |

* cited by examiner

CARBON EMISSION OPTIMIZATION FOR DEVICE LIFECYCLE MANAGEMENT

CROSS-REFERENCE TO RELATED APPLICATIONS

This application claims priority from provisional U.S. Application No. 63/487,002, filed on Feb. 26, 2023, and entitled "System and Engine for Carbon-Aware Mobile Device Triage and Repair," which is incorporated herein by reference in its entirety.

FIELD OF THE INVENTION

The present disclosure relates, generally, to systems, methods, and apparatuses for optimizing resource usage, including by reducing carbon emissions and increasing carbon efficiency in mobile device lifecycle operations.

BACKGROUND

Many environments are resource constrained. Applicant has identified a number of deficiencies and problems associated with managing resource usage. Through applied effort, ingenuity, and innovation many deficiencies of existing systems have been solved by developing solutions that are in accordance with the embodiments as discussed herein, many examples of which are described in detail herein.

BRIEF SUMMARY

In general, embodiments of the present disclosure provided herein may relate to optimizing carbon emission and various associated systems, apparatus, methods, computer readable media and computer program products. Other implementations for optimizing carbon emission will be, or will become, apparent to one with skill in the art upon examination of the following figures and detailed description. It is intended that all such additional implementations be included within this description be within the scope of the disclosure and be protected by the following claims.

Various embodiments are directed to apparatuses, methods, computer readable media, computer program products, and systems related to optimizing carbon emission. Various embodiments may include a system for carbon optimized repair of a plurality of mobile devices. The system may include a camera, at least one processor, and at least one non-transitory memory comprising instructions that, with the at least one processor, cause the system to: electrically connect with the mobile device; receive device data from the mobile device via the electronic connection, the device data comprising a device identifier; capture images of the mobile device using the camera; programmatically diagnose, using the at least one processor, at least one defect with the mobile device based on the electronic data and/or the images; identify a plurality of solutions for the at least one defect; apply the device identifier and information associated with the at least one defect to one or more models to generate lifecycle efficiency prediction data for the mobile device for the plurality of solutions for the at least one defect by applying predictive resource usage data for each solution for the at least one defect and device lifespan data associated with at least one subsequent use period of the plurality of use periods of the mobile device to the one or more models; select a carbon minimized solution of the plurality of solutions based on the lifecycle efficiency predictions, wherein the carbon minimized solution comprises a carbon consumption per unit time less than any other of the plurality of solutions; cause application of the carbon minimized solution to the mobile device to resolve the at least one defect by transmitting a signal configured to initiate replacement of at least one component of the mobile device with at least one replacement component; electronically associate the mobile device with a user; and cause one or more electronic signals configured to initiate transmission of the mobile device to the user. In various embodiments, the at least on defect comprises an electronic fault determined via a diagnostic run on the mobile device, and is reported to the system through the electronic connection. In various embodiments, programmatically diagnosing the at least one defect comprises analyzing the captured images to determine the at least on defect. In various embodiments, the predictive resource usage data for each of the plurality of solutions for the at least one defect comprises the resource usage for the mobile device over the at least one subsequent use period for the respective solution. In various embodiments, the one or more models are configured to generate the lifecycle efficiency prediction data for each solution by: generating, a resource usage score for each solution based on the predictive resource usage data associated with the respective solution; and comparing the resource usage score for each solution with the device lifespan data. In various embodiments, the device lifespan data comprises a lifespan impact metric data object for each of the plurality of solutions for the at least one defect. In various embodiments, the one or more models are configured to generate each lifecycle efficiency prediction data for each solution by generating and programmatically assembling one or more lifecycle efficiency prediction segments for one or more of a plurality of segments of device data associated with the mobile device. In various embodiments, the one or more models are machine learning models trained using aggregated device data sets from a plurality of devices comprising two or more different devices. In various embodiments, selecting the carbon minimized solution comprises: programmatically ranking the plurality of solutions based on the lifecycle efficiency prediction data associated with each solution of the plurality of solutions for the at least one defect. In various embodiments, selecting the carbon minimized solution comprises: receiving user input indicative of the carbon minimized solution based on the lifecycle efficiency predictions; and programmatically selecting the carbon minimized solution. In various embodiments, the instructions, with the at least one processor, further cause the system to: generate a control signal causing a renderable data object comprising one or more of the predictive resource usage data, the device lifespan data, or the lifecycle efficiency prediction data for one or more of the plurality of solutions to be displayed on a user interface of a client device.

Various embodiments may include a computer-implemented method for carbon optimized repair of a plurality of mobile devices. The computer-implemented method may comprise: electrically connecting with the mobile device; receiving device data from the mobile device via the electronic connection, the device data comprising a device identifier; capturing images of the mobile device; programmatically diagnosing at least one defect with the mobile device based on the electronic data and/or the images; identifying a plurality of solutions for the at least one defect; applying the device identifier and information associated with the at least one defect to one or more models to generate lifecycle efficiency prediction data for the mobile device for the plurality of solutions for the at least one defect by applying predictive resource usage data for each solution for the at least one defect and device lifespan data associated with at least one subsequent use period of the plurality of use periods of the mobile device to the one or more models; selecting a carbon minimized solution of the plurality of solutions based on the lifecycle efficiency predictions, wherein the carbon minimized solution comprises a carbon consumption per unit time less than any other of the plurality of solutions; causing application of the carbon minimized solution to the mobile device to resolve the at least one defect by transmitting a signal configured to initiate replacement of at least one component of the mobile device with at least one replacement component; electronically associating the mobile device with a user; and causing one or more electronic signals configured to initiate transmission of the mobile device to the user. In various embodiments, the at least on defect comprises an electronic fault determined via a diagnostic run on the mobile device, and is reported to the system through the electronic connection. In various embodiments, programmatically diagnosing the at least one defect comprises analyzing the captured images to determine the at least on defect. In various embodiments, the predictive resource usage data for each of the plurality of solutions for the at least one defect comprises the resource usage for the mobile device over the at least one subsequent use period for the respective solution. In various embodiments, the one or more models are configured to generate the lifecycle efficiency prediction data for each solution by: generating, a resource usage score for each solution based on the predictive resource usage data associated with the respective solution; and comparing the resource usage score for each solution with the device lifespan data. In various embodiments, the device lifespan data comprises a lifespan impact metric data object for each of the plurality of solutions for the at least one defect. In various embodiments, the one or more models are configured to generate each lifecycle efficiency prediction data for each solution by generating and programmatically assembling one or more lifecycle efficiency prediction segments for one or more of a plurality of segments of device data associated with the mobile device. In various embodiments, the one or more models are machine learning models trained using aggregated device data sets from a plurality of devices comprising two or more different devices. In various embodiments, selecting the carbon minimized solution comprises: In various embodiments, programmatically ranking the plurality of solutions based on the lifecycle efficiency prediction data associated with each solution of the plurality of solutions for the at least one defect. In various embodiments, selecting the carbon minimized solution comprises: receiving user input indicative of the carbon minimized solution based on the lifecycle efficiency predictions; and programmatically selecting the carbon minimized solution. In various embodiments, the computer-implemented method further comprising generating a control signal causing a renderable data object comprising one or more of the predictive resource usage data, the device lifespan data, or the lifecycle efficiency prediction data for one or more of the plurality of solutions to be displayed on a user interface of a client device.

Various embodiments may include at least one non-transitory computer readable medium having computer coded instructions configured to, when executed by at least one processor: electrically connect with a mobile device; receive device data from the mobile device via the electronic connection, the device data comprising a device identifier; capture images of the mobile device using a camera; programmatically diagnose, using the at least one processor, at least one defect with the mobile device based on the electronic data and/or the images; identify a plurality of solutions for the at least one defect; apply the device identifier and information associated with the at least one defect to one or more models to generate lifecycle efficiency prediction data for the mobile device for the plurality of solutions for the at least one defect by applying predictive resource usage data for each solution for the at least one defect and device lifespan data associated with at least one subsequent use period of the plurality of use periods of the mobile device to the one or more models; select a carbon minimized solution of the plurality of solutions based on the lifecycle efficiency predictions, wherein the carbon minimized solution comprises a carbon consumption per unit time less than any other of the plurality of solutions; cause application of the carbon minimized solution to the mobile device to resolve the at least one defect by transmitting a signal configured to initiate replacement of at least one component of the mobile device with at least one replacement component; electronically associate the mobile device with a user; and cause one or more electronic signals configured to initiate transmission of the mobile device to the user.

BRIEF DESCRIPTION OF THE DRAWINGS

Reference will now be made to the accompanying drawings, which are not necessarily drawn to scale, and wherein.

DETAILED DESCRIPTION

Figure 1:
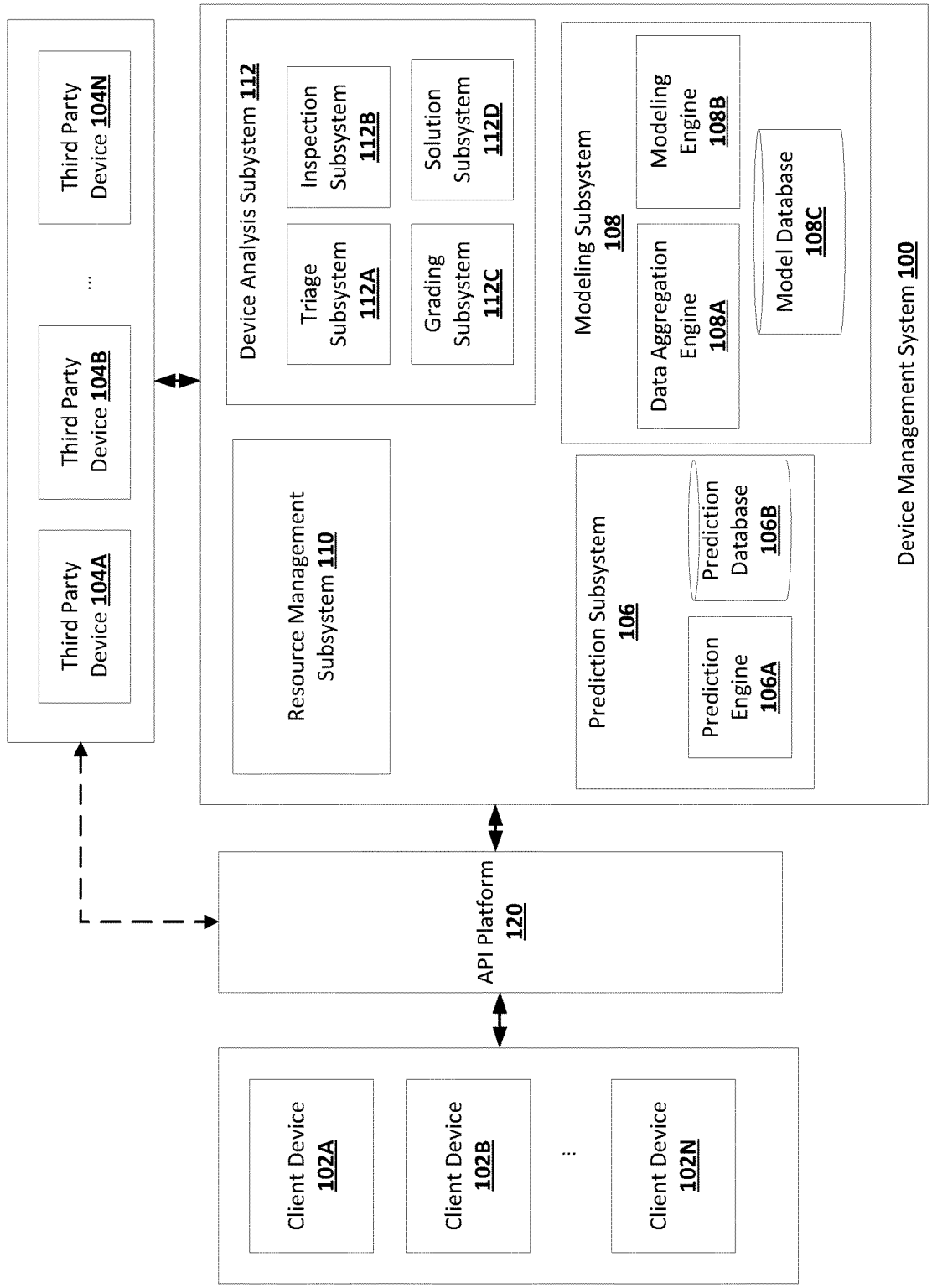
FIG. 1 illustrates a schematic block diagram of a Device Management system that may be specifically configured, within which embodiments of the present disclosure may operate.

The present disclosure more fully describes various embodiments with reference to the accompanying drawings.

It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Device operation and device-related functions and processes require resources to effect. Device resource usage cannot be adequately tracked and optimized by current systems. Provided herein are various systems, methods, apparatuses, and other features related to device resource usage optimization, including but not limited to data gathering and modeling, calculating resource usage, optimizing resource usage and/or lifecycle efficiency of one or more devices, and/or controlling and directing modification and/or disposition of one or more devices, including but not limited to adding subsequent use periods to reduce the resource usage and improve the lifecycle efficiency of a device.

Embodiments of the present disclosure include data gathering and aggregation processes, systems, and apparatuses configured to collect resource usage data associated with one or more devices. The data may be broken down into segments associated with various aspects of the devices, including one or more lifecycle stages, one or more components, and/or any other resource-using aspects of a device or device lifecycle (or portion thereof), and/or including data indicative of such resource usage, such as device make, model, location, or the like. Non-limiting examples of such data include device processing data, device characteristic data, component data, direct consumption data, and/or channel data as described herein. Such device data may include scope 1, 2, and/or 3 carbon emissions data associated with such devices for each lifecycle stage and/or each other data segment.

The device data may then be aggregated in one or more different ways (e.g., via various combinations of device data segments) to prepare data sets and ultimately models specific to one or more devices or groups of devices.

The device data may then be used to model (e.g., via statistical inference, artificial intelligence, calculation, or other determination means) granular resource usage data and/or lifecycle efficiency determinations for one or more devices. The granularity facilitated by such modeling may be at the make and model level and, in some embodiments, at an individual device level (e.g., an IMEI level). For example, such modeling may facilitate determining a particular resource usage associated with one or more lifecycle stages and/or other processes associated with a particular device, such as one or more solutions, at a level that is predictive of the particular device or a small group (e.g., make and model with or without geographic limitation) of devices. In some embodiments, such models may be configured to allocate and/or prorate resource usage across the lifecycle stages to accurately reflect the resource usage cost of each lifecycle stage. In various embodiments, limited information about a device, such as a device identifier and/or device location detected by GPS or other means, may be used as an input to such models. In some embodiments, inferences may be made about the input (e.g., a geographic location associated with a particular IMEI, particular device make, particular device model, and/or the like).

These models may be made even for devices that have not been directly observed or for which direct data is not available by programmatically modeling the resource usage and/or lifecycle efficiency of the device using one or more data segments associated with the received device data (e.g., combinations of aggregated data segments matching one or more features of the particular device being modeled, including the lifecycle stages associated with the device). The result may be the granular modeling described herein.

Embodiments of the systems, apparatuses, and methods discussed herein may use the resource usage data determinations and/or lifecycle efficiency data determinations to control and direct one or more downstream processes, which may optimize the device resource usage and/or lifecycle efficiency. Such processes may include, but are not limited to, directing, controlling, effecting, and/or otherwise facilitating device triage and the implementation of one or more solutions. Such processes may additionally or alternatively include, but are not limited to, directing, controlling, effecting, and/or otherwise facilitating device disposition, which may include one or more second use periods, final disposition, or the like. In some embodiments, such processes may include individual component or subassembly level triage, solutions, and/or dispositions that differ from one or more other components of a device (e.g., directing a component of a first device to be added to another device (reused) while recycling or disposing of one or more other components of the first device or replacing the component with another component and directing a subsequent use period for the first device). In some embodiments, the processes herein may additionally or alternatively include programmatic determinations for functions such as supply chain management and/or channel allocation. Examples of such systems and processes are disclosed in U.S. Publication No. 2020/0042920, filed May 20, 2019; and U.S. application Ser. No. 17/936,543, filed Sep. 29, 2022.

In some embodiments, the model(s) may be configured to programmatically optimize resource usage data and/or lifecycle efficiency across a plurality of devices, such as combining resource usage for shared functions (e.g., reduced resource usage for co-processing with the same system, shared transmission channels, etc.). The model(s) may be configured to generate one or more reports or audits of a device lifecycle efficiency and/or resource usage (or portions thereof).

Various technical improvements will be appreciated from the present disclosure. In some embodiments, non-limiting examples of such technical improvements facilitated by one or more embodiments discussed herein include improved functioning of a device (e.g., mobile devices or other devices discussed herein). For example, solutions may be configured to improve the performance of and/or extend the lifespan of a device beyond its original manufactured capabilities. In some embodiments, non-limiting examples of such technical improvements facilitated by one or more embodiments discussed herein include improved diagnosis and repair of defects. For example, embodiments of the present disclosure may facilitate using more precise data modeling and optimized solutions to diagnose and repair one or more defects in a manner that optimizes resource usage and/or lifecycle efficiency. In some embodiments, non-limiting examples of such technical improvements facilitated by one or more embodiments discussed herein include resource usage (e.g., minimizing resource usage) and/or lifecycle efficiency optimization (e.g., extending lifespan and/or improving resource usage per unit of lifespan), which may facilitate net resource savings (e.g., materials, energy, bandwidth, and/or carbon efficiency). In some embodiments, non-limiting examples of such technical improvements facilitated by one or more embodiments discussed herein include supply chain optimization and/or large scale efficiency improvements, such as by higher throughput, more efficient decision making, and/or faster processing and disposition of devices between use periods. Some further examples of technical improvements include improved technical support via programmatic diagnosis and individualized recommendations. Customer service systems, such as the customer service systems and associated systems and processes discussed in U.S. Pat. No. 9,413,893 filed Mar. 15, 2013; and the computing device repair systems and associated processes and systems discussed in U.S. Publication No. 2021/0248618 filed Feb. 8, 2021. The foregoing patents and patent applications are hereby incorporated by reference herein in their entireties. One or more of the various functions herein, including resource usage optimization and/or lifecycle efficiency optimization may be performed in real time or near real time (e.g., by pre-generating one or more models for rapid application to a new device).

Definitions

In some embodiments, some of the operations above may be modified or further amplified. Furthermore, in some embodiments, additional optional operations may be included. Modifications, amplifications, or additions to the operations above may be performed in any order and in any combination.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, and/or the like. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," refers to a physical storage medium (e.g., volatile, or non-volatile memory device), and may be differentiated from a "computer-readable transmission medium," which refers to an electromagnetic signal.

As used herein, the terms "data structure", "data object", or "data set" refer interchangeably to a collection of data capable of being collectively transmitted, received, and/or stored.

As used herein, the term "device management system" refers to one or more computing devices embodied in hardware, software, firmware, and/or a combination thereof configured to programmatically facilitate minimization and allocating of resource usage for a device, for example, via operational choices.

As used herein, "user device" and "device" refer to computer hardware and/or software configured to be associated with a user and used for one or more portions of a device lifecycle. As used herein, the term "device lifecycle" refers to one or more stages of the life of a device, optionally including, but not limited to, any one or more of sourcing of raw material; manufacture of the device, including one or more components thereof; one or more use periods of the device; one or more device triage periods of the device. As used herein, "mobile device" may refer to a device that is capable of being held and transported by a user. Example mobile devices include but not limited to, smart phones, tablet computers, laptop computers, wearables, laptop computers, and/or the like. In some examples, a device may be associated with an identifier. In some embodiments, a device may be associated with or otherwise defined by one or more device data segments. In some examples, a device may be associated with a use period and/or a sequence of use periods.

As used herein, the term "client device" may refer to computer hardware and/or software that is configured to access a service, for example, made available by a server.

The server is often (but not always) on another computer system, in which case the client device accesses the service by way of a network. Client devices may include, without limitation, smart phones, tablet computers, kiosk, terminal, laptop computers, wearables, personal computers, enterprise computers, and/or the like. Client devices, as described herein, may communicate with and/or otherwise access a device support management system, via one or more networks.

As used herein, the term "device identifier" refers to one or more items of data by which a device or a group of devices may be uniquely identified from other devices. A device identifier, for example, may comprise any number of data items that identifies a subset of devices from a population of devices. In some examples, a device identifier may comprise input data configured to be applied to a model. In some embodiments, a device identifier may comprise ASCII text, a pointer, a memory address, and/or other data that uniquely identifies a particular device or group of devices.

As used herein, the term "device component identifier" and "component identifier" refer to one or more items of data by which a "device component" or group of device components may be uniquely identified. A device component refers to a component of a device or a component for one or more devices. For example, a device component identifier may comprise ASCII text, a pointer, a memory address, and/or other data that identifies a particular device component or group of device components.

As used herein, the term "device data" refers to a data entity associated with a device, including data generated by a device and data generated about a device. Device data may include one or more device data segments. As used herein, the term "device data segment" refers to device data associated with a device or a portion thereof, including a device lifecycle or portion thereof. Non-limiting examples of device data segments include "device processing data" (e.g., device allocation and registration, device shipping type, packaging materials, device manufacturing method, and/or the like); "device characteristic data" (e.g., device type, device model, device location, device geographic region of service, and/or the like), which may include "component data" (e.g., device battery type, device screen type, device processor type, and/or the like); "direct consumption data" (e.g., actual and/or predicted energy consumption of the device); and/or "channel data" (e.g., a pathway from which a device may be received or into which a device may be transmitted for disposition and/or various data associated therewith). Device data segments may be or may include resource usage data associated with a device or device lifecycle, including portions thereof. In some examples, device data and/or one or more segments of device data may be leveraged to generate lifecycle efficiency prediction(s) for solution(s) that may be employed to resolve a defect associated with a device.

As used herein, the term "use period" refers to a data entity that describes a time interval in which a device is associated with a user. For example, a use period may comprise a period in which a device is linked to a user account. In some examples, a use period may represent a lifecycle stage of a plurality of lifecycle stages of a device. Additionally or alternatively, in some examples, a use period may be associated with one or more lifecycle stages of a device. In some examples, each use period of a sequence of use periods for a device may be associated with device data associated with one or more device data of the device. For example, a first use period and a second use period may be associated with different device data.

As used herein, the term "device triage period" refers to a portion of a lifecycle of a device between use periods or before a use period. During the device triage period, a device may be analyzed for one or more defects. The device may additionally or alternatively undergo one or more solutions to one or more defects, which may include repairing the defect. The device triage period may include allocating the device to a new user and/or directing any disposition of the device.

As used herein, the term "defect" refers to any actual and/or perceived imperfection, fault, abnormality, and/or similar terms, that impairs the quality, function, utility, and/or appearance of device. For example, a defect may comprise any feature that makes a device less than "like-new" quality, including mechanical faults (e.g., stuck camera lens, electrical faults (e.g., faulty hardware and/or hardware performing substandard, such as a reduced battery capacity, faulty or broken touch screen, non-functioning camera, or the like), software faults (e.g., operating system errors, application crashes, lagging, etc.), cosmetic imperfections or damage (e.g., broken glass, cracks, scratches, chips, or the like), and/or the like. In some examples, a defect may be associated with one or more components of a device, including hardware components and non-hardware components. In some examples, defects may be classified via diagnostic algorithms into one or more categories, or otherwise classified by type. Non-limiting examples of defect categories include cosmetic or performance related defects (e.g., whether the defect affects the operation of the device); repairable or not repairable defects; remotely repairable (e.g., defects whose solutions may include remote software fixes, shipped parts directly to customers, or the like) or non-remotely repairable defects; critical or non-critical defects (e.g., defects affecting the ability of the device to enter a subsequent use cycle). In some examples, a particular defect may be resolved with one or more solutions.

As used herein, the term "solution" refers to a data entity that describes a potential resolution for one or more defects associated with a device. Non-limiting examples of solutions include remote resolution (e.g., remotely repaired via software update), onsite resolution (e.g., physical or electronic resolution at a device support location), a combination thereof, and/or the like. Non-limiting examples of solutions include application or application update installation, repair, replacement, refurbishment, a combination thereof, and/or the like. In some examples, a solution may include a disposition of the device (e.g., channel selection, such as sale or recycling) and/or no modification to the device, such as in the event that the defect cannot be repaired or is not worth repairing as programmatically determined by device lifecycle efficiency predictions. In some examples, a solution may include a channel selection, such as programmatically matching a solution and a state of the device following the solution with the quality of device accepted by one or more channels (e.g., "like-new" devices may be resold in a retail location, "functioning, good condition" devices may be directed to a wholesaler, etc.). Solutions may include computer-executable instructions configured to cause one or more assemblies to direct the device to a particular location (e.g., configuring a sorting machine, such as a robotic arm or a sortation conveyor). In some examples, a particular solution of a plurality of solutions may be selected and performed (e.g., automatically) to resolve a defect. Additionally or alternatively, in some examples, a solution may be selected based on user input and performed (e.g., automatically) in response to the selection. For example, a user may be presented with a plurality of solutions to select a preferred solution to be performed to resolve a defect with a device associated with the user. In some embodiments, two or more solutions may be ranked for lifecycle efficiency prediction, resource usage, or another metric and presented for selection to a user via a graphical user interface. In some examples, each solution of a plurality of solutions that may be employed to resolve a defect may be associated with one or more device lifecycle stages. Additionally or alternatively, in some examples, each solution of a plurality of solutions that may be employed to resolve a defect may be associated with one or more of resource usage data, lifespan data, and/lifecycle efficiency prediction for the solution. In some examples, one or more solutions for a defect may be selected from a plurality of sequentially and/or simultaneously executed solutions (including, without limitation, any two or more of the solutions discussed above) based on one or more of the resource usage data, the device lifespan data, and/or the lifecycle efficiency predictions for the solutions.

As used herein, the term "model" refers to a data entity that describes parameters, hyper-parameters, and/or defined operations of a rules-based algorithm, machine learning model (e.g., model including at least one or more rule-based layers, one or more layers that depend on trained parameters, coefficients, and/or the like), and/or the like. In some examples, one or more models may be configured, trained, and/or the like to generate lifecycle efficiency predictions for potential solution(s) for resolving a defect based on resource usage data and/or lifespan data associated with the solutions. In some examples, one or more models may be trained using aggregated device data sets from a plurality of devices to generate lifecycle efficiency predictions. In some examples, one or more models, may include one or more of any type of machine learning model including one or more supervised, unsupervised, semi-supervised, reinforcement learning models, and/or the like. In some examples, one or more models may include multiple models configured to perform one or more different stages of a prediction process.

As used herein, the term "resource usage data" refers to data indicative of resource requirements and/or resource cost, including but not limited to resource requirements and/or resource cost associated with one or more device data segments, solutions, lifecycle stages, or the like. Resource usage data may comprise actual and/or predicted resource requirements and/or resource cost associated with one or more elements of a device, including for example, resource requirements and/or resource cost data associated with material processing, manufacturing, transportation/shipping, end of life activities (e.g., recycling), usage (e.g., electrical or other consumable resources), and/or the like. Resource requirements and/or resource cost may include direct and indirect requirements or costs, which requirements or costs may include net inputs and/or outputs associated with a device (e.g., energy fed into a device, whether directly or indirectly, for operation and/or emissions produced by a device, whether directly or indirectly). Non-limiting examples of resource usage data include processor usage; bandwidth; other computational resources; storage space; actual and/or predicted energy requirements/cost for one or more device lifecycle stages, actual and/or predicted greenhouse gas emissions (e.g., carbon dioxide for one or more device life cycle stages, actual and/or predicted material requirements/cost for one or more device life cycle stages, and/or the like). Other examples are provided herein. In some examples, resource usage data may include a resource consumption structure associated with a device such as, for example, energy consumption structure associated with a particular device element type, greenhouse gas emission structure associated with a particular device element type, and/or the like. In some examples, resource usage data may reflect actual and/or predicted ecological footprint associated with one or more device lifecycle stages such as, for example, carbon footprint. In some examples, predictive resource usage data may be retrieved from various data sources, including for example, third-party data sources. Additionally or alternatively, in some examples, predictive resource usage data may be derived from data retrieved from various data sources. In some examples, predictive resource usage data may comprise aggregated data associated with a plurality of devices. In some examples, predictive resource usage may be leveraged to determine lifecycle efficiency predictions for solutions that may be employed to resolve a defect.

As used herein, the term "lifespan data" refers to data that is indicative of actual or expected (e.g., predicted) length of life of a device or a portion thereof. For example, lifespan data may include data that is indicative of an actual or expected average length of time and/or maximum length of time that a device and/or a device component is functional, free of defects, and/or otherwise usable or suitable for one or more purposes. In some examples, lifespan data may comprise a time interval defined by a use period start timestamp and a use period end timestamp. In some instances, lifespan data may be measured in one or more segments (e.g., segments associated with one or more lifecycle stages). In some examples, one or more solutions that may be employed to resolve a defect may be associated with respective lifespan data (e.g., an effect of the solution on the lifespan of a device or a device component). In some examples, lifespan data may be leveraged, at least in part, to determine lifecycle efficiency predictions for solutions that may be employed to resolve a defect associated with a device. In some examples, lifespan data comprises a lifespan impact metric for each solution of a plurality of solutions. As used herein, the term "lifespan impact metric" refers to a data entity that describes how much the lifespan of a device and/or device component can be altered based on one or more particular solution.

As used herein, the term "lifecycle efficiency prediction data" refers to data generated programmatically as an output of one or more models that is leveraged to determine optimal solution for resolving a defect associated with a device. Each solution of a plurality of solutions that may be employed to resolve a defect with a device may be associated with a lifecycle efficiency prediction. Lifecycle efficiency prediction data may include a data entity representing the efficiency of a solution. In some examples, each lifecycle efficiency prediction for a solution may be generated based on the resource usage data for the solution and/or lifespan data associated with the device, which may include a lifespan impact metric. Lifecycle efficiency prediction data may include a data entity representing a resource usage per unit lifespan. For example, lifecycle efficiency prediction data may correspond to a programmatically determined assessment of one or more solutions of a defect that considers more than the absolute resource usage, and may include the resource usage per unit lifespan added as a result of the solution. By way of non-limiting example, if a first solution comprising replacing a part costs two pounds of carbon and adds five years of predicted lifespan to the device, the lifecycle efficiency prediction data associated with the first solution may be greater than a second solution comprising doing nothing (at a cost of zero pounds of carbon) with a zero predicted lifespan change or a third solution comprising replacing multiple components and shipping the device to a farther location at a cost of ten pounds of carbon for a six year addition of lifespan.

System Architecture

Methods, apparatuses, systems, computer readable media, and computer program products of the present disclosure may be embodied by any of a variety of devices in various system architectures. For example, the method, apparatus, system, computer readable media, and computer program product of an example embodiment may be embodied by one or more computing devices, such as a server or other entity, configured to communicate with one or more devices, such as client devices, third-party devices, or the like, and/or one or more third-party servers. Example embodiments include one or more servers configured to facilitate various functions associated with device management, including resource management, device analysis, resource usage modeling, and/or one or more additional functions associated with device management. Additionally, or alternatively, methods, apparatuses, systems, computer-readable media, and/or computer program product of an example embodiment may be embodied by one or more software modules configured to perform some or all of the operations performed disclosed herein and executed on one or more hardware modules or systems, such as one or more servers connected to one or more other devices and/or network.

In this regard, FIG. 1 is a schematic block diagram of an example device management system 100 that may be configured to communicate with one or more client devices 102A-102N and/or one or more third party devices 104A-104N according to embodiments of the present disclosure. The device management system 100 may be configured to facilitate and/or perform various functions associated with optimizing resource usage, including programmatically facilitating minimization and allocating of resource usage for a device or a group of devices in an environment. The device management system may leverage one or more systems, subsystems, and/or components to facilitate and/or perform one or more functions of the device management system, including, for example, modeling and predicting resource usage for one or more devices, modeling and predicting lifecycle efficiency for one or more devices, and/or the like.

The device management system 100 may be configured to transmit request(s) to a third party system (e.g., via third party device 104A-104N) to facilitate access to one or more third party data, access to one or more third party computing resources, access to one or more third party services, and/or the like. For example, in some embodiments, the device management system 100 may assemble aggregated device dataset(s) for prediction and/or modeling resource usage and/or related processes based on data obtained from one or more third party systems.

As illustrated, the device management system 100 may include one or more subsystems and/or components, including hardware, software, and/or firmware, for carrying out various functions according to embodiments of the present disclosure. In some embodiments, one or more illustrated subsystems and/or components may be discrete systems and/or components or may be part of larger systems (e.g., device management system 100) without departing from the present disclosure. In some embodiments, one or more illustrated subsystems and/or components may be external to the device management system 100. As illustrated, the device management system 100 may include prediction subsystem 106, a modeling subsystem 108, a resource management subsystem 110, and/or a device analysis subsystem 112. In some embodiments, the resource management subsystem 110 and/or the device analysis subsystem 112 may be external to the device management system 100 (e.g., a contact center, repair center, warehouse, and/or the like associated with the device management system 100).

In some embodiments, an API platform 120 may be configured to communicate with and/or facilitate communication between one or more of the prediction subsystem 106, modeling subsystem 108, resource management subsystem 110, device analysis subsystem 112, one or more client devices 102A-102N, and/or one or more third party devices 104A-104N. In some embodiments, one or more of the client devices 102A-102N may be included in the device management system 100 (e.g., used by an operator or other user associated with the device management system) or may be external to the device management system 100 (e.g., used by a customer, vendor, or other separate user entity). In some embodiments, the functions of one or more of the illustrated systems, subsystems, and components may be performed by a single computing device or by multiple computing devices.

The various systems, subsystems, and components illustrated in FIG. 1 may be configured to communicate via one or more communication mechanisms, including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to TCP/IP based networking protocols. For example, the device management system 100, including the API platform 120, may be connected to the client devices 102A-102N and/or third party devices via one or more networks. In various embodiments, the systems, devices, subsystems, and components depicted in FIG. 1 as being included in the system 100, although not required to be an integral system, may be connected via one or more networks.

As depicted, an API platform 120 may be provided, which may be configured to facilitate communication to, from, and/or between one or more of the other depicted systems, subsystems, and components. In various embodiments, the API platform 120 may comprise an API configured to serve as a gateway for the one or more client devices 102A-102N to the device management system 100. In some embodiments, the API may be the sole gateway for all client-based (e.g., user-based, provided-based, and/or the like) functionality associated with the device management system 100, which API may interact with a plurality of clients on a plurality of client devices. In various embodiments, the API platform 120 may comprise an API configured to serve as a gateway for the one or more third-party devices 104A-104N to the device management system 100. In some embodiments, the API may be the sole gateway for all third party-based functionality associated with the device management system 100, which API may interact with a plurality of clients on a plurality of third-party devices. The API platform 120 may be configured to facilitate the operations of the device management system 100 for the modeling, predicting, assembling, minimizing, and/or allocating resource usage, and/or for any functions related to any of the foregoing. The API platform 120 may comprise one or more services, a server cluster, one or more network nodes, a cloud computing infrastructure, one or more desktop computers, one or more laptop computers, one or more mobile computing devices, some combination thereof, or the like. The API platform 120 may be separate from or integrated into any of the other hardware and/or software of the device management system 100. In some embodiments, the device management system 100 may not include an API Platform. For example, in some embodiments, the one or more of the depicted systems, subsystems, and components may be configured to communicate with one another without using API platform.

The device management system 100 may include a prediction subsystem 106 which may comprise one or more computing devices embodied hardware, software, firmware and/or a combination thereof configured to facilitate and/or perform various functions associated with the device management system 100. In some embodiments, the prediction subsystem 106 includes a prediction engine 106A configured to leverage one or more models to generate output data that may be used to facilitate minimization and/or allocation of resource usage data.

In some embodiments, the prediction subsystem 106 may include a prediction database 106B that may be used to store data associated with request data objects, devices, users, solutions for resolving device defects, channels contributing to resource usage, processes contributing to resource usage, and/or other data related to efficient and accurate modeling and prediction of resource usage for devices, device lifecycle, lifecycle efficiency, lifespan, and/or related processes. Additionally, in some embodiments, the prediction database 106B may be used to store any additional data accessed by and/or otherwise associated with the prediction subsystem 106. The prediction database 106B may store data that the prediction subsystem 106 may utilize when predicting resource usage data, and/or predicting other data associated with minimizing and allocating resource usage. The prediction database 106B may be accessed by the prediction engine 106A to facilitate various functions thereof. Additionally, in some embodiments, the prediction database 106B may be configured for access by other subsystems and/or components of the device management system 100.

In some embodiments, the prediction subsystem 106 may comprise hardware, software, and/or firmware configured to communicate with one or more systems, subsystems, devices, and/or components associated with the device management system 100 to facilitate performance of one or more functions of the prediction subsystem 106. In some embodiments, the prediction subsystem 106 may comprise hardware, software, and/or firmware configured to receive request data objects originating from a client device, such as client device 102A-102N. In some embodiments, a request data object may be associated with a request for resource usage data, a request for lifecycle efficiency data, a request for optimal solution(s) that consider resource usage, and/or other request associated with minimizing and allocating resource usage.

The device management system 100 may include a modeling subsystem 108 which may comprise one or more computing devices embodied in hardware, software, firmware and/or a combination thereof configured to facilitate and/or perform various functions associated with the device management system. In some embodiments, the modelling subsystem 108 may comprise hardware, software, and/or firmware configured to generate, train, retrain, and/or update one or more models. In some embodiments, the modeling subsystem 108 may comprise hardware, software, and/or firmware configured to interact with one or more data sources (e.g., prediction database 106B, model database 108C, or any other system-internal or external data source) to receive a broad range of data that may be used to generate the one or more models. In some embodiments, the modeling subsystem 108 may include a data aggregation engine 108A and a modeling engine 108B configured to facilitate and/or perform one or more functions of the modeling subsystem.

In some embodiments, the modeling subsystem 108 may include a model database 108C that may be used to store data that the modeling subsystem 108 (e.g., modeling engine 108B thereof) may utilize when modeling resource usage or other related processes. For example, the model database 108C may store model(s) generated by the modeling subsystem (e.g., modeling engine 108B thereof) Additionally, in some embodiments, the model database 108C may be used to store any additional data accessed by and/or otherwise associated with the modeling subsystem 108. The model database 108C may be accessed by the modeling engine 108B to facilitate various functions thereof. Additionally, in some embodiments, the model database 108C may be configured for access by other subsystems and/or components of the device management system 100.

The system 100 may be configured to model the resource usage and/or lifecycle efficiency of one or more devices based on the various models and aggregated data sets, or any portion thereof, discussed herein. The modeling process may include assigning a resource usage (e.g., lb emissions, such as carbon dioxide emissions; power usage; etc.) associated with one or more lifecycle phases of the device, including but not limited to one or more raw material/production phases; transmission (e.g., transportation) phases; use phase (s); and/or end-of-life phases. The system may be able to analyze subsequent use phases as well as device triage decisions to optimize the lifecycle efficiency of the device (s). In some embodiments, the system may model a single type of resource (e.g., lb emissions, such as carbon dioxide emissions; power usage; etc.) or a combination of two or more types of resource. In some embodiments, the system may encrypt or otherwise store the device data and/or the predictions in a secure environment protected by a password (e.g., IMEI as a password) to display the resource usage and/or lifecycle efficiency data to only authorized users and/or authorized systems.

The device management system 100 may include a resource management subsystem 110 which may comprise one or more computing devices embodied in hardware, software, firmware and/or a combination thereof configured to facilitate and/or perform various functions associated with the device management system. In some embodiments, the resource management subsystem 110 may comprise hardware, software, and/or firmware configured to communicate with one or more systems, subsystems and/or components (e.g., subsystems, device, and/or components of the device management system 100, third party systems, and/or the like) to facilitate optimization and/or allocation of resource usage and/or facilitate one or more other functions of the device management system. In some embodiments, the resource management subsystem (e.g., a portion thereof) may be configured to interact with one or more systems or components of the device managements system 100 and one or more client devices (e.g., client devices 102A-102N and/or third party client devices 104A-104N) via the API platform 120. In some embodiments, the resource management subsystem 110 (e.g., a portion thereof) may act as an execution layer between one or more clients and one or more backend internal/third party systems.

In some embodiments, the resource management subsystem 110 may comprise hardware, software, and/or firmware configured to communicate with one or more subsystems, devices, and/or components to initiate, direct, and/or manage sourcing and/or allocation of devices, device components, and/or services. For example, the resource management subsystem 110 may communicate with one or more third party client devices associated with a third party (e.g., third party device provider, third party device component provider, third party service provider, and/or the like) to source and/or direct the third party client devices to allocate and/or transmit one or more devices, device components, and/or services provided by the third party.

Additionally or alternatively, in some embodiments, the resource management subsystem 110 may comprise hardware, software, and/or firmware configured to select a solution for a device based at least in part resource usage data associated with the device for one or more candidate solutions. In some embodiments, a defect may describe any actual and/or perceived imperfection, fault, abnormality, and/or similar terms, that impairs the quality, function, utility, and/or appearance of device. As described herein, examples of a defect may comprise any feature that makes a device less than "like-new" quality, including mechanical faults (e.g., stuck camera lens, electrical faults (e.g., faulty hardware and/or hardware performing substandard, such as a reduced battery capacity, faulty or broken touch screen, non-functioning camera, or the like), software faults (e.g., operating system errors, application crashes, lagging, etc.), cosmetic imperfections or damage (e.g., broken glass, cracks, scratches, chips, or the like), and/or the like. In some examples, defects may be classified via diagnostic algorithms into one or more categories, or otherwise classified by type. Non-limiting examples of defect categories include cosmetic or performance related defects (e.g., whether the defect affects the operation of the device); repairable or not repairable defects; remotely repairable (e.g., defects whose solutions may include remote software fixes, shipped parts directly to customers, or the like) or non-remotely repairable defects; critical or non-critical defects (e.g., defects affecting the ability of the device to enter a subsequent use cycle). In some examples, a particular defect may be resolved with one or more solutions. In some embodiments, a solution may describe a potential resolution for a defect associated with a device. In some examples, a solution may include a disposition of the device (e.g., sale or recycling). In some examples, a solution may include no modification to the device, such as in the event that the defect cannot be repaired or is not worth repairing as programmatically determined by device lifecycle efficiency predictions, where device lifecycle efficiency predictions may be determined based on resource usage data associated with the respective solution for the defect. In some examples, a solution may include a channel selection, such as programmatically matching a solution and a state of the device following the solution with the quality of device accepted by one or more channels (e.g., "like-new" devices may be resold in a retail location, "functioning, good condition" devices may be directed to a wholesaler, etc.).

In some embodiments, the resource management subsystem 110 may comprise hardware, software, and/or firmware configured to communicate with one or more subsystems and/or components to initiate or direct execution of a selected solution or solutions. For example, in some embodiments, the resource management subsystem 110 may comprise hardware, software, and/or firmware configured to communicate with one or more systems, subsystems, and/or components to cause the one or more systems, subsystems, and/or components to perform various functions on a device corresponding to the selected solution(s). For example, the resource management subsystem 110 may direct one or more assemblies (e.g., machinery, equipment, etc.) and/or systems to perform various functions on the device, such as repair functions, refurbishment functions, and/or other functions associated with a selected solution for the device. In some embodiments, a solution may include computer-executable instructions configured to cause one or more assemblies to direct the device to a particular location (e.g., configuring a sorting machine, such as a robotic arm or a sortation conveyor) to facilitate execution of the solution.

In some embodiments, the resource management subsystem 110 may comprise hardware, software, and/or firmware configured to select one or more channels for transmitting or receiving a device and/or device component based on resource usage data associated with candidate channels and/or lifecycle efficiency predictions that reflects resource usage data associated with the candidate channels. Additionally, in some embodiments, the resource management subsystem 110 may comprise hardware, software, and/or firmware configured to programmatically initiate and/or direct transmitting and/or receiving of one or more devices and/or device components via the selected one or more channels. For example, The device management system 100 may include a device analysis subsystem 112 which may comprise one or more computing devices embodied in hardware, software, firmware and/or a combination thereof configured to facilitate and/or perform various functions associated with the device management system 100. The device analysis subsystem 112 may comprise hardware, software, and/or firmware configured to determine defect(s) associated with a device. Additionally or alternatively, the device analysis subsystem 112 may comprise hardware, software, and/or firmware configured to grade a device. Additionally or alternatively, the device analysis subsystem 112 may comprise hardware, software, and/or firmware configured to determine candidate solutions for resolving defect(s) associated with a device. Device diagnosis, analysis, and repair tools, including without limitation screen crack detection and associated processes and systems as discussed in U.S. Pat. No. 10,332,249, filed Mar. 7, 2017; screen crack detection and device occlusion detection, and associated processes and systems as discussed in U.S. Publication No. 20210081712A1, filed Sep. 16, 2020; mobile device triage processes and systems as discussed in U.S. Pat. No. 9,483,344, filed Mar. 15, 2013; device inspection and grading systems and associated processes and systems as discussed in U.S. Pat. No. 11,580,627, filed Jan. 5, 2021; and device analysis, comparison, and diagnosis tools and associated processes and systems as discussed in U.S. Pat. No. 10,073,754, filed Sep. 13, 2013. The foregoing patents and patent applications are hereby incorporated by reference herein in their entireties.

In some embodiments, the device analysis subsystem 112 may comprise hardware, software, and/or firmware configured to store data associated with various functions performed by the device analysis subsystem 112. In some embodiments, the device analysis subsystem 112 may leverage one or more systems, subsystems, devices, and/or components to perform the various functions of the device analysis subsystem 112.

In some embodiments, the device analysis subsystem 112 may comprise a triage subsystem 112A. In some embodiments, the triage subsystem 112A may comprise hardware, software, and/or firmware configured to perform one or more device triage operations on a device. In some embodiments, the triage subsystem 112A may comprise hardware, software, and/or firmware configured receive instruction(s), signal(s) and/or data from one or more subsystems and/or components associated with the device management system 100, and facilitate and/or perform one or more device triage operations responsive to the received instruction(s), signal(s) and/or data. In one example embodiment, the triage subsystem 112A may comprise hardware, software, and/or firmware configured to receive instruction(s), signal(s) and/or data from the resource management subsystem 110, and facilitate and/or perform one or more device triage operations in response to the one or more instructions, signals, and/or data received from the resource management subsystem 110. In some embodiments, the triage subsystem 112A may comprise hardware, software, and/or firmware configured to communicate with a device to facilitate and/or perform device triage operation(s). For example, the triage subsystem 112A may embody a computer link (e.g. USB and/or other computer link) for connecting the triage subsystem 112A to a device to allow the triage subsystem to facilitate and/or perform triage operation(s) on the device.

The device analysis subsystem 112 may comprise an inspection system 112B. In some embodiments, the inspection system 112B may comprise hardware, software, and/or firmware configured to execute one or more inspection operations on a device. In some embodiments, the inspection system 112B may comprise hardware, software, and/or firmware configured receive instruction(s), signal(s) and/or data from one or more subsystems, devices, and/or components associated with the device analysis subsystem 112, and facilitate and/or perform one or more device inspection operations responsive to the received instruction(s), signal(s) and/or data. In one example embodiment, the inspection system may comprise hardware, software, and/or firmware configured to receive instruction(s), signal(s) and/or data from the resource management subsystem 110, and facilitate and/or perform one or more device inspection operations in response to the one or more instructions, signals, and/or data received from the resource management subsystem 110. By way of non-limiting example, the inspection system 112B may include one or more conveyors configured to receive and convey one or more devices for inspection; one or more robotic arms configured to hold one or more devices for inspection; an imaging system including one or more cameras for capturing images of one or more devices for inspection; and/or an electronic analysis system configured to electrically communicate (e.g., wirelessly or via USB) with one or more devices for electronically inspecting the devices (e.g., running diagnoses, collecting data from the device(s), wiping and/or modifying the memory of the device(s), etc.).

The device analysis subsystem 112 may comprise a grading system 112C. In some embodiments, the grading system 112C may comprise hardware, software, and/or firmware configured to grade a device (e.g., assign one or more grades to a device). In some embodiments, the grading system 112C may comprise hardware, software, and/or firmware configured to determine a grade for a device based on instruction(s), signal(s) and/or data received from one or more systems, subsystems, devices, and/or components associated with the device analysis subsystem 112. In one example embodiment, the inspection system may comprise hardware, software, and/or firmware configured to receive signal(s) and/or data from the triage subsystem 112A and/or inspection system 112B, and process the received signal(s) and/or data to determine one or more grades for a device. The received signal(s) and/or data may comprise or otherwise reflect one or more of results of device triage operations performed on the device by the triage subsystem 112A or inspection operations performed on the device by the inspection system 112B.

In some embodiments the grading system may include one or more imaging devices and/or physical and/or electronic interfaces for inspecting and determining a grade associated with the device. In some embodiments, the grade may be based on the condition of the device (e.g., the presence, absence, and/or severity of one or more defects). In some embodiments, the model(s) discussed herein may receive a device grade as an input which may inform if a device is allocated to a subsequent use phase (e.g., versus immediately being sent to end-of-life processes) and/or the type of subsequent use phase (e.g., resale, insurance claim fulfillment, etc.).

The device analysis subsystem 112 may comprise a solution system 112D. In some embodiments, the solution system 112D may comprise hardware, software, and/or firmware configured to determine solutions data for a device. In some embodiments, the solutions data may include data indicative of one or more candidate solutions for resolving a defect associated with a device.

In some embodiments, the device analysis subsystem 112 may comprise hardware, software, and/or firmware configured to communicate with one or more other systems, subsystems, devices, and/or components of the device management system 100. In some embodiments, the device analysis subsystem 112 may comprise hardware, software, and/or firmware configured to provide one or more outputs of the device analysis subsystem (e.g., device triage output of the triage subsystem 112A, device inspection output of the inspection system 112B, grading output of the grading system 112C) to the resource management subsystem. By way of non-limiting example, the device analysis subsystem 112 (e.g., via solution system 112D) may include one or more recommendation engines for identifying and/or handling the outputs of the device analysis subsystem 112 and/or communicating the outputs to a user. By way of non-limiting example, the device analysis subsystem 112 (e.g., via solution system 112D) or resource management subsystem 110 may additionally or alternatively include one or more physical apparatuses for affecting a solution, including but not limited to one or more repair robots configured to perform one or more repairs on one or more devices; one or more conveyor systems for transporting one or more devices; and/or one or more packaging systems for controlling disposition of a device, along with processing hardware and software associated with any of the foregoing.

In some embodiments, one or more client devices 102A-102N may be provided. The client device(s) may be a component of device management system 100 or separate from the device management system 100. The one or more client devices 102A-102N may each be embodied as an computing device including any hardware, software, and/or firmware, such as by way of non-limiting example, a cellular phone, smart phone, communication device, tablet computing device, digital camera/camcorder, audio/video player, digital video recorder, laptop, computing device, desktop computing device, terminal, kiosk, a web interface accessed via a device, a mobile application accessed via a device, wearable computing device, server, internet of things computing devices, mobile computing device, and/or any combination thereof. By way of example, a client device may comprise a customer service computing device, a customer computing device, a vendor computing device, or the like. In some embodiments, the client device 102A-102N may allow front or backend access to the API platform 120 and/or one or more components, subsystems, or systems of the device management system 100. In various embodiments, the client device 102A-102N may additionally or alternatively allow a user access to one or more functions and/or data associated with one or more other systems and/or subsystems (e.g., prediction subsystem 106, modeling subsystem 108, resource management subsystem 110, device analysis subsystem 112, and/or the like). In various embodiments, a client device 102A-102N may interact with the API platform 120 as the sole gateway for at least some functions of the device management system 100. In various embodiments, each client device 102A-102N may individually communicate with the API platform 120 (via one or more networks). In some embodiments, a client device 102A-102N may include an interface (e.g., operator interface/user interface) configured to receive an indication of an operator/user input. As such, the client device 102A-102N may include, for example, a keyboard, a mouse, a joystick, a touch screen display, a microphone, a speaker, and/or other input and/or output mechanisms.

Example Apparatuses of the Disclosure

Having discussed example systems in accordance with the present disclosure, example apparatuses in accordance with the present disclosure will now be described.

Figure 2:
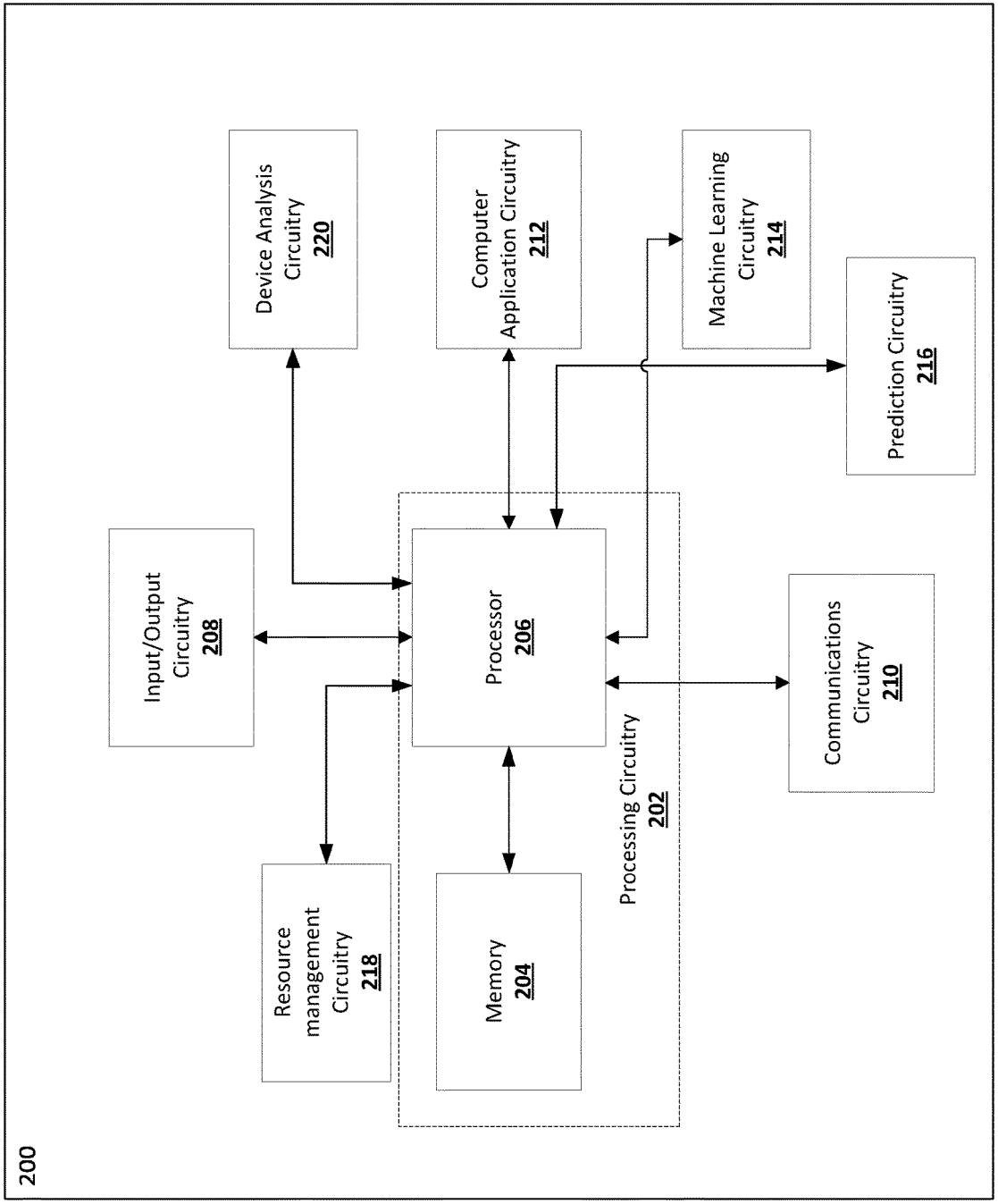
FIG. 2 illustrates a block diagram of an apparatus that may be specifically configured, within which embodiments of the present disclosure may operate.

FIG. 2 illustrates a block diagram of an apparatus 200 in accordance with some example embodiments. For example, in some embodiments, device management system 100 (or one or more portions thereof) and/or the API platform 120, if embodied in a particular embodiment, may be embodied by one or more apparatuses 200. In some embodiments, the device management system 100 may include a processing circuitry 202 as shown in FIG. 2 with respect to the apparatus 200. It should be noted, however, that the components, or elements illustrated in and described with respect to FIG. 2 below may not be mandatory and thus one or more may be omitted in certain embodiments. Additionally, some embodiments, may include further or different components or elements beyond those illustrated in and described with respect to FIG. 2. In some embodiments, the functionality of the device management system 100 or any subset thereof may be performed by a single apparatus 200 or multiple apparatuses 200. In some embodiments, the apparatus 200 may comprise one or a plurality of physical devices.

Although components are described with respect to functional limitations, it should be understood that the particular implementations necessarily include the use of particular computing hardware. It should also be understood that certain of the components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

In some embodiments, "circuitry" may include processing circuitry, storage media, network interfaces, input/output devices, and/or the like. In some embodiments, other elements of the apparatus 200 may provide or supplement the functionality of another particular set of circuitry. For example, the processor 206 in some embodiments provides processing functionality to any of the sets of circuitry, the memory 204 provides storage functionality to any of the sets of circuitry, the communication circuitry 210 provide network interface functionality to any of the sets of circuitry, and/or the like.

The apparatus 200 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the apparatus 200 in accordance with various example embodiments, and thus may provide means for performing functionalities of the apparatus 200 in accordance with various example embodiments. The processing circuitry 202 may be configured to perform data processing, application and function execution, and/or other processing and management services according to one or more example embodiments. In some embodiments, the apparatus 200 or a portion(s) or component(s) thereof, such as the processing circuitry 202, may be embodied as or comprise a chip or chip set. In other words, apparatus 200 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (and/or co-processor or any other processing circuitry assisting or otherwise associated with the processor) and, in some embodiments, such as that illustrated in FIG. 2, may further include memory 204. The processing circuitry 202 may be in communication with or otherwise control a user interface (e.g., embodied by input/output circuitry 208), a communication circuitry 210, and/or a computer application circuitry 212. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the apparatus 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the apparatus 200, and/or one or more remote or "cloud" processor(s) external to the apparatus 200.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the apparatus 200 to carry out various functions in accordance with one or more example embodiments. For example, the memory 204 may be configured to buffer input data for processing by the processor 206. Additionally or alternatively, the memory 204 may be configured to store instructions for execution by the processor 206. As yet another alternative, the memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processor 206, user interface 208, communication circuitry 210, or computer application circuitry 212 via a bus(es) for passing information among components of the apparatus 200.

The input/output circuitry 208 may provide output to the user or an intermediary device and, in some embodiments, may receive one or more indication(s) of user input. In some embodiments, the input/output circuitry 208 is in communication with processor 206 to provide such functionality. The input/output circuitry 208 may include one or more user interface(s) and/or include a display that may comprise the user interface(s) rendered as a web user interface, an application interface, and/or the like, to the display of a user device, a backend system, or the like. The input/output circuitry 208 may be in communication with the processing circuitry 202 to receive an indication of a user input at the user interface and/or to provide an audible, visual, mechanical, or other output to the user. As such, the input/output circuitry 208 may include, for example, a keyboard, a mouse, a joystick, a display, a touch screen display, a microphone, a speaker, and/or other input/output mechanisms. As such, the input/output circuitry 208 may, in some example embodiments, provide means for a user to access and interact with the apparatus 200. The processor 206 and/or input/output circuitry 208 comprising or otherwise interacting with the processor 206 may be configured to control one or more functions of one or more user interface elements through computer program instructions (e.g., software and/or firmware) stored on a memory accessible to the processor 206 (e.g., stored on memory 204, and/or the like).

The communication circuitry 210 may include one or more interface mechanisms for enabling communication with other devices and/or networks. In some cases, the communication circuitry 210 may be any means such as a device or circuitry embodied in either hardware, or a combination of hardware and software that is configured to receive and/or transmit data from/to a network and/or any other device or module in communication with the processing circuitry 202. By way of example, in an instance in which the API platform 120 is embodied as an apparatus 200 or a portion thereof, the communication circuitry 210 may be configured to enable the apparatus 200 to communicate with the dynamic resource assembly system 104 and/or other computing devices via a network, bus, or the like. Accordingly, the communication circuitry 210 may, for example, include an antenna (or multiple antennas) and supporting hardware and/or software for enabling communications with a wireless communication network (e.g., a wireless local area network, cellular network, global positioning system network, and/or the like) and/or a communication modem or other hardware/software for supporting communication via cable, digital subscriber line (DSL), universal serial bus (USB), Ethernet or other methods. In an instance in which the API platform 120 is embodied as an apparatus 200 or a portion thereof, the communication circuitry 210 may be configured to, alone or in combination with other circuitry, such as the computer application circuitry 212 and/or processing circuitry 202, process, transform, receive, and/or transmit various signals to and from the system or system components and subsystems.

In some embodiments, the processor 206 (or the processing circuitry 202) may be embodied as, include, or otherwise control a computer application circuitry 212. As such, the computer application circuitry 212 may be embodied as various means, such as circuitry, hardware, a computer program product comprising computer readable program instructions stored on a computer readable medium (for example, the memory 204) and executed by a processing device (for example, the processor 206), or some combination thereof. The computer application circuitry 212 may be capable of communication with one or more of the memory 204, input/output circuitry 208, or communication circuitry 210 to access, receive, and/or send data as may be needed to perform one or more of the functionalities of the computer application circuitry 212, including some or all of the functions associated with the system or component embodied by the apparatus 200 as described herein. In accordance with some example embodiments, the computer application circuitry 212 may provide means for implementing and controlling functionality of a computer application associated with the embodiments disclosed herein.

In various embodiments, the apparatus 200 may include machine learning circuitry 214, which may include hardware components, software components, and/or a combination thereof designed or configured to request, receive, process, generate, and transmit data, data structures, control signals, and electronic information for training and executing one or more trained machine learning model configured to facilitate the functionalities described herein, including assembly, management, and/or updating, and/or optimizing resource usage with respect to one or more devices. The one or more machine learning models may include any type of machine learning model including one or more supervised, unsupervised, semi-supervised, reinforcement learning models, and/or the like. In some examples, one or more models may include multiple models configured to perform one or more different stages of a prediction process The machine learning circuitry 214 may operably couple with the prediction circuitry 216, device analysis circuitry 220, resource management circuitry 218, computer application circuitry 212 and/or any other apparatus or component to facilitate one or more of the various processes described herein. The machine learning circuitry 214 may provide for communication with other components of the apparatus, system, and/or external systems via a network interface provided by the communications circuitry 210.

In some embodiments, the apparatus 200 may include prediction circuitry 216 which may include hardware components, software components, and/or a combination thereof designed or configured to generate, maintain, update, and provide access to one or more models and/or data used by the one or more models to model to generate output that may be used to facilitate optimization and/or allocation of resource usage, including but not limited to resource usage data and lifecycle efficiency prediction data for a device(s) and/or device component(s). The prediction circuitry 216 may facilitate access to data used by the one or more models (e.g., models generated and/or operated at the machine learning circuitry 214) through the use of applications or APIs executed using a processor, such as the processor 206. It should also be appreciated that, in some embodiments, the prediction circuitry 216 may include a separate processor, specially configured field programmable gate array (FPGA), or application specific interface circuit (ASIC) to manage the access and use of the relevant data. The prediction circuitry 216 may also provide for communication with other components of the apparatus, system and/or external systems via a network interface provided by the communications circuitry 210. The prediction circuitry 216 may therefore be implemented using hardware components of the apparatus configured by either hardware or software for implemented the various functions.

In some embodiments, the apparatus 200 may include a resource management circuitry 218, which may include hardware components, software components, and/or a combination thereof designed or configured to initiate, direct, and/or manage dispositions and/or solutions associated with a device. The resource management circuitry may facilitate access to data used by one or more other components through the use of applications or APIs executed using a processor, such as the processor 206. However, it should also be appreciated that, in some embodiments, the resource management circuitry 218 may include a separate processor, specially configured field programmable gate array (FPGA), or application specific interface circuit (ASIC) to manage the access and use of the relevant data. The resource management circuitry 218 may provide for communication with other components of the apparatus, system, and/or external systems via a network interface provided by the communications circuitry 210.

In some embodiments, the apparatus 200 may include a device analysis circuitry 220, which may include hardware components, software components, and/or a combination thereof designed or configured to interface with a device (such as a mobile device) to execute or cause execution of one or more operations on the device, such as device triage, device inspection, device grading, device repair, device refurbishment, and/or the like. The device analysis circuitry may facilitate access to data used by one or more other components through the use of applications or APIs executed using a processor, such as the processor 206. However, it should also be appreciated that, in some embodiments, the device analysis circuitry 220 may include a separate processor, specially configured field programmable gate array (FPGA), or application specific interface circuit (ASIC) to manage the access and use of the relevant data. The device analysis circuitry 220 may provide for communication with other components of the apparatus, system and/or external systems via a network interface provided by the communications circuitry 210.

Having now generally described several embodiments of the apparatuses, the operation of the API platform will now be described in accordance with several example embodiments.

Example API Platforms

As discussed above, the API platform (e.g., API platform 120 shown in FIG. 1) may comprise hardware, software, or both configured to facilitate operation of an API according to various embodiments of the present disclosure. While described herein as a single "API" for example purposes, the API may comprise one or more APIs embodied on one or more computing devices. The API may comprise a software interface configured to facilitate communication between two or more computing devices or portions of computing devices (e.g., various components or systems described herein). The API may be configured to serve as a gateway for one or more user devices (including, but not limited to, all user devices) associated with the operation (e.g., front end operation) of the processes and systems described herein. As described herein, the API may present simplified and intuitive calls to the client devices (e.g., client devices 102A-102N) and/or third party devices (e.g., third party devices 104A-104N), including any provider devices 124) to facilitate external interaction with the device management system 100. Moreover, in various embodiments, the API may further present one or more internal or external API calls to one or more internal components and subsystems configured to facilitate coordination and streamlining of system operations. In some embodiments, the API may at least facilitate resource usage modeling and prediction. In some embodiments, communication gateways other than the API platform 120 may be used for one or more functions.

Figure 3:
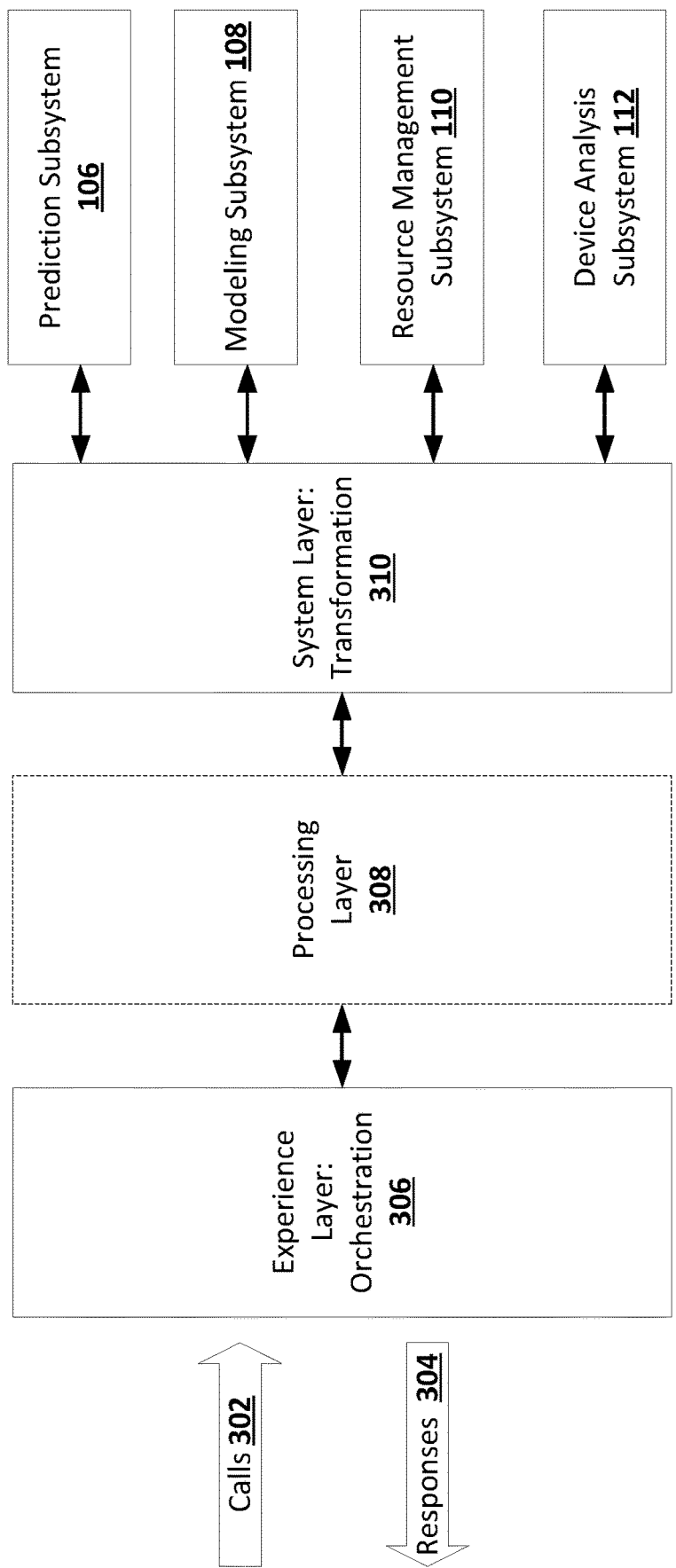
FIG. 3 illustrates an example flow of an API in accordance with various embodiments, of the present disclosure.

FIG. 3 illustrates an example data flow of an API facilitated by an API platform (e.g., API platform 120 shown in FIG. 1). In the illustrated embodiment, the API receives one or more calls 302 from one or more requesting devices (e.g., client device), systems, subsystems, or other components and returns one or more responses 304 to the requesting devices (e.g., client device), systems, subsystems, or other components. The calls may be generated by any of the entities shown or described herein, including, by way of example, any client devices 102A-N(via one or more clients operating on such devices), the prediction subsystem 106, the modeling subsystem 108, the resource management subsystem 110, and/or the device analysis subsystem 112 (in each instance, embodies of which are illustrated in FIG. 1). The respective requesting device (e.g., client device), system, or component may be programmed with one or more specific calls to transmit to the API based on an API specification associated with the API. The one or more calls may be transmitted in at least some instances in which the requesting device needs data and/or functional coordination with any other connected device (e.g., in connection with the logical process flow). In this manner, the API may serve as a gateway to the internal processes of the system and may be built atop and may provide interoperability between one or more independent client devices, systems, subsystems, or other components, including various microservices.

As further illustrated in FIG. 3, the API may comprise two or more layers embodied in software and/or hardware. The layers may include, for example, an experience layer 306 and a system layer 310. The experience layer 306 may be oriented to the user of the API such as various portals, clients, etc. associated with the devices discussed above. The experience layer may be configured to receive the calls, which may simplify integration for the users and client devices by receiving and handling intuitive calls formulated logically based on the functions they are configured to invoke without regard to the respective backend devices, components or systems that execute the function. The experience layer 306 may thereby be responsible for orchestration of the internal functionality of the system, with a front end of the experience layer being responsible for simplification of integration of the internal functionality for the requesting devices and the backend supporting realization of value by calling the system layer. The experience layer 306 may be configured to expose one or more external API calls to the plurality of clients and transform the one or more external API calls into one or more internal API calls directly or indirectly (e.g., via one or more processing layers 308) to the system layer 310. In various embodiments, the system layer 310 of the API may be oriented to the internal devices, systems, subsystems, and/or components capable of executing one or more functions in furtherance of the calls.

By way of example, FIG. 3 shows the resource management subsystem 110, device analysis subsystem 112, and modeling subsystem 108 connected to the system layer 310 and configured to receive computer program instructions (e.g., API calls) from the system layer and to return data and/or execute functions upon receipt of such instructions. The primary role of the system layer 310 may be transformation, with the system layer being oriented to the backend devices, systems, subsystems, and components. The system layer 310 may include a frontend that may be responsible for abstraction of the differences and inconsistencies in the backend relative to the initial calls received by the experience layer 306. The backend of the system layer 310 then utilizes the individual source systems (e.g., prediction subsystem 106, modeling subsystem 108, resource management subsystem 110, and/or device analysis subsystem 112) to process the requests. In some embodiments, the system layer may be configured to receive the one or more internal API calls directly or indirectly from the experience layer 306 and transmit computer executable instructions to execute one or more functions, by way of non-limiting example on one or more devices and/or with respect to one or more devices. In some embodiments, the API may comprise an additional one or more processing layers 308 between the experience layer 306 and the system layer 310 configured to further streamline the transformation and processing of incoming calls to the API. The API may serve as the gateway for calls between two or more of the systems, subsystems, client devices, or other components shown and described herein. Any of the various programmatic functions described herein may be executed via a set of calls and responses between the respective requesting device, the API, and the respective responding device(s).

Having now generally described several embodiments of the API platform, the operation of resource usage modeling will now be described in accordance with several example embodiments.

Example Resource Usage Modeling

As described above, various embodiments of the present disclosure provide for optimization and/or allocation of resource usage with respect to a device, such as a mobile device. Additionally, various embodiments provide for determining optimal lifecycle efficiency. In some embodiments, optimizing resource usage may include minimizing total resource usage. In some embodiments, to facilitate optimization and/or allocation of resource usage, one or more models may be generated, configured, trained and/or the like to receive input data associated with a device and predict resource usage for the device or a subset of the device's total resource usage, including, for example, resource usage associated with one or more lifecycle stages of the device. The received input data may comprise one or more input factors associated with one or more device segments of device data for a device or group of devices, and which may be leveraged to determine resource usage data for the device or group of devices. As described further below, a lifecycle efficiency prediction model may be generated based on the one or more models. For example, a lifecycle efficiency prediction model may comprise at least one of the one or more models.

Figure 4:
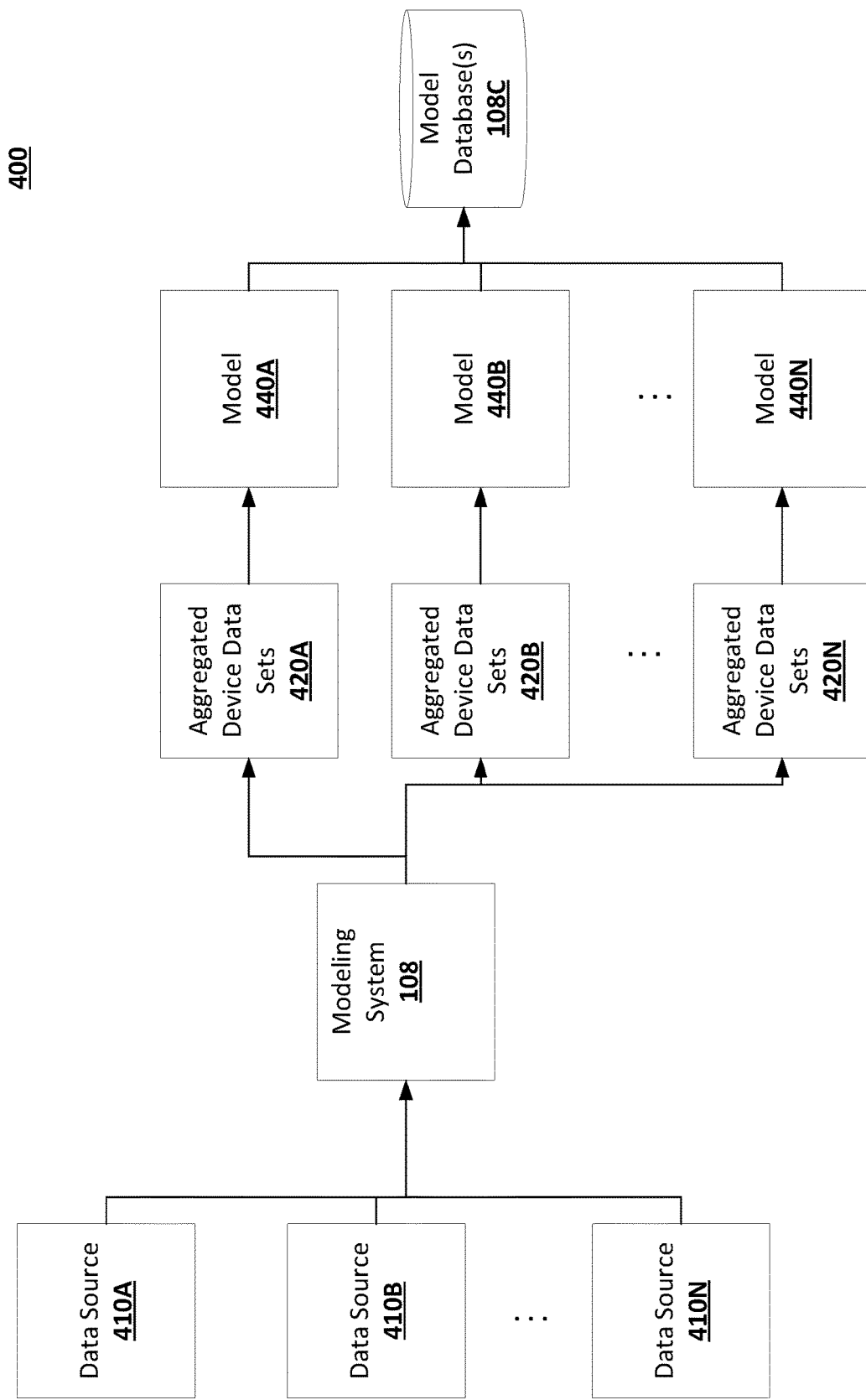
FIG. 4 illustrates an example flow diagram for modeling resource usage.

FIG. 4 provides an example flow diagram 400 for modeling resource usage. As depicted in FIG. 4, a modeling subsystem, such as modeling subsystem 108 may generate one or more models 440A-440N configured to predict resource usage data. As described herein, predicted resource usage may be used to facilitate optimization and/or allocation of resource usage via operational choices. In some embodiments, resource usage data may comprise data indicative of resource requirements and/or resource cost, including but not limited to resource requirements and/or resource cost associated with one or more device data segments, solutions, lifecycle stages, or the like. Resource requirements and/or resource cost may include direct and indirect requirements or costs, which requirements or costs may include net inputs and/or outputs associated with a device (e.g., energy fed into a device, whether directly or indirectly, for operation and/or emissions produced by a device, whether directly or indirectly). Non-limiting examples of resource usage data include actual and/or predicted energy requirements/cost for one or more device lifecycle stages, actual and/or predicted greenhouse gas emissions (e.g., carbon dioxide for one or more device life cycle stages, actual and/or predicted material requirements/cost for one or more device life cycle stages, and/or the like).

In some embodiments, the one or more models 440A-440N may be generated, configured, and/or trained using an expansive knowledge base, including, for example, a large data corpus. The modeling subsystem 108 may be capable of interacting with a broad range of data sources 410A-410N to receive a broad range of data, including device data associated with a plurality of devices. In various embodiments, the broad range of data enables accurate modeling of resource usage, including modeling at a granular level. In some embodiments, one or more of the data sources 410A-410N may be associated with third party systems. Additionally or alternatively, in some embodiments, one or more of the data sources may be internal to the system 100 and/or internal to the entity associated with the system 100. In some embodiments, the modeling subsystem 108 may be capable of interacting with third party systems associated with device manufacturers, device component manufacturers, power suppliers, materials acquirers (e.g., miners, sourcing agents, etc.), repair centers, and/or other entities to obtain various data that may be leveraged to aggregate, generate, configure, train, re-train, and/or update the one or more models 440A-440N.

A data source from which the modeling subsystem 108 may receive data that may be used to model resource usage and/or other measures for facilitating optimization and/or allocation of resource usage is a data source which may include data regarding resource usage associated with various device models and/or device component models (e.g., one or more data segments). Such data source my include (otherwise have access to) information scraped, extracted, and/or otherwise acquired from one or more records of past resource usage data for one or more device types, device models, device component types, device component models, and/or the like. Such data may be retrieved from memory within the system (e.g., historical data or data otherwise already stored in the system) or from third party data sources.

Another data source from which the modeling subsystem 108 may receive data that may be used to model resource usage and/or other measures for facilitating optimization and/or allocation of resource usage is a data source which may include data (e.g., one or more data segments) regarding resource usage associated with one or more individual device lifecycle stages for one or more device types, device models, device component types, device component models, and/or the like. Such data source my include (otherwise have access to) information scraped, extracted, and/or otherwise acquired from one or more records of past resource usage data associated with device lifecycle for the respective device types, device models, device component types, device component models, and/or the like. Such data may be retrieved from memory within the system (e.g., historical data or data otherwise already stored in the system) or from third party data sources.

Another data source from which the modeling subsystem 108 may receive data that may be used to model resource usage and/or other measures for facilitating optimization and/or allocation of resource usage is a data source which may include data (e.g., one or more data segments) regarding resource usage associated with one or more use period(s) of one or more device types, device models, and/or the like. Such data source my include (otherwise have access to) information scraped, extracted, and/or otherwise acquired from one or more records of activities/research conducted by actors (e.g., academia) in the market and/or analysis of such activities/research. Such data may be retrieved from memory within the system (e.g., historical data or data otherwise already stored in the system) or from third party data sources.

Another data source from which the modeling subsystem 108 may receive data that may be used to model resource usage and/or other measures for facilitating optimization and/or allocation of resource usage may include data (e.g., one or more data segments) regarding resource usage associated with one or more solutions (e.g., repairs, refurbishments, recycling, disposal, etc.) for one or more device types, device models, device component types, device component models, and/or the like. Such data source my include (otherwise have access to) information scraped, extracted, and/or otherwise acquired from one or more records of resource usage data for the one or more solutions. Such data may be retrieved from memory within the system (e.g., historical data or data otherwise already stored in the system) or from third party data sources.

Another data source from which the modeling subsystem 108 may receive data that may be used to model resource usage and/or other measures for facilitating optimization and/or allocation of resource usage is a data source which may include data (e.g., one or more data segments) regarding device characteristics/attributes for one or more device types, device models, and/or the like; and/or data regarding device component characteristics/attributes for one or more device component types, device component models, and/or the like. Such data source my include (otherwise have access to) data regarding the structure, function, operation, use, age, features, and/or other characteristics of the respective device and device components. Such data may be retrieved from memory within the system (e.g., historical data or data otherwise already stored in the system) or from third party data sources.

One or more other data sources from which the modeling subsystem 108 may receive data that may be used to model resource usage and/or other measures for facilitating optimization and/or allocation of resource usage is a data source which may include data (e.g., one or more data segments) regarding past defects associated with certain device(s) and/or components thereof, data regarding troubleshooting data, customer service data, and/or repair data that may be used in connection with determining whether the life of a device may be extended, and/or the like. Such data may be retrieved from memory within the system (e.g., historical data or data otherwise already stored in the system) or from third party data sources. It should be understood that the foregoing examples are not intended to be limiting.

In some embodiments, the received data from the plurality of data sources may be stored in one or more databases, such as the model database 108C and/or other database associated with the system 100. In some embodiments, the plurality of data sources may include the devices themselves, where data regarding resource usage of the devices may be reported by the devices themselves. For example, a given device may provide or otherwise report resource usage data of the device itself or a portion of the device. The received data may be stored in the one or more databases in a variety of forms (e.g., relational table, lookup table, etc.). In some embodiments, one or more pre-processing operations may be performed on the received data. For example, in some embodiments, such as when data is acquired in multiple different formats, upon receipt of the data, the modeling subsystem 108 may scale, cleanse, normalize, and/or otherwise format the received such that they can be processed by the data aggregation engine 108A, and/or the modeling engine 108B of the modeling subsystem 108.

The modeling subsystem 108 (e.g., data aggregation engine 108A thereof) may assemble, based on the data (e.g., device data) received from the plurality of data sources, one or more aggregated device datasets for generating and training the one or more models 440A-440N. In one example embodiment, each aggregated device dataset may comprise resource usage data associated with a plurality of input factors (e.g., types of data segments), where the resource usage data for the input factors may be determined based on device processing data, device characteristics, component data, direct consumption data, channel data, disposition data, and/or other device data. In some embodiments, the input factors may include one or more variables configured to affect the model. By way of non-limiting example, the input factors may include one or more of a device IMEI, device make/model, device component type(s), country of origin of the device, country of destination of the device, disposition purpose, refurbishing, packaging, type of recycling or repurposing process used for the device and the emissions generated during the manufacturing and transportation, etc. Various input factors may be collected directly (e.g., via electronic communication with one or more mobile devices), may be stored following such communication for subsequent retrieval, or may be gathered, measured, and/or determined through various other means. In some embodiments, the models may be generated and trained using any of the foregoing input factors, and the models may be configured to predict resource usage and/or lifecycle efficiency data based on a device identifier.

In some embodiments, input factors for the model generation and/or training may be inferred from known device data. Non-limiting example inferences include: associating a geographic location associated with a particular IMEI; assigning an average value for one or more input factors from known sources based on the year of release of the device; defining a baseline and adding deltas based on the different and/or extra components (e.g., same model device with multiple versions that have different memory sizes may have a delta applied to account for the change in memory from known data); defining a methodology to understand the resource usage impact of each component (e.g., based on the components of the device, such as battery size, memory size, screen size, chipset, and/or other components); retrieve devices of similar specifications and/or other characteristics and adjust the input factors based on differences between the known and unknown devices (e.g., a model may be trained on known devices and granularized to individual input factors, which input factors may be retrieved and input for a new, unknown device to predict various lifecycle resource usage associated with the new, unknown device and its parts). An example table of possible input factors (also referred to as data segments), which may be used alone or in combination to generate and/or run the model(s) is included below:

TABLE 1

| Input | Description |
| --- | --- |
| Device Manufacturer | Company that manufactures the device, e.g., Apple, Samsung, etc. |
| Device Model | Model of the device, e.g., iPhone 11, Galaxy S20, etc. |
| Resource Usage (e.g., lb emissions) | Total lifespan resource usage for the device |
| % Raw Materials/Production | Percentage of the resource usage assigned to the raw materials/production process. |
| % Transmission | Percentage of the resource usage assigned to the transmission of a device from production to the first use phase |
| % Use Phase | Percentage of the resource usage assigned to a use phase of the device |
| % End of Life | Percentage of the resource usage assigned to the end of life procedures |
| Device Weight | Actual weight of the device |
| Raw Material Usage | Actual raw material resource quantity used by the device (e.g., lb carbon) |
| Transmission Material Usage | Actual transmission material resource quantity used by the device |
| Use Phase Material Usage | Actual use phase material resource quantity used by the device |
| End of Life Material Usage | Actual end of life material resource quantity used by the device |
| Non-Use Phase Material Usage | All non-use-phase material resource quantities used by the device |

TABLE 1-continued

| Input | Description |
| --- | --- |
| Location | Geographic region or specific location detected in association with the device |
| Primary Data/Secondary Data Source | Flag of data type Source identifier for the device data |
| Age/Time Period Data Quality | Quality grade based on aging of the data |
| Geographical Area Data Quality | Quality grade based on location relevance of the data (e.g., scored by closeness of the data to the location of device being modeled) |
| Technology Data Quality | Quality grade relevance of the data (e.g., scored by closeness of the data to the type of device being modeled) |
| Overall Data Quality | Cumulative quality grade of the data |
| Scope 3 Data | Additional data modifier for indirect/scope 3 resource usage. |

In some embodiments, the channels from which a device originates and to which a device is allocated may also affect the resource usage and/or lifecycle efficiency and may include their own data segments. In some embodiments, the transmission of the device may affect the resource usage, and various input factors, such as location, weight, size, channel type, or the like of the overall device as well as one or more components may affect the resource usage assigned to the transmission of the device. Packaging may similarly have a resource usage incorporated into the modeling process. In some embodiments, one or more solutions (e.g., repair/refurbishment of a device) may include their own associated resource usage. Thus, each lifecycle efficiency prediction may include a portion for the solution(s). Moreover, other non-limiting examples of device data segments that may be included in the resource usage and/or lifecycle efficiency models discussed herein include average device weight; average packaging weight; proportion of total weight taken up by packaging material; road transport vehicle; air transport; percentage laden (e.g., road transport); transport distance; choice of emission factors (e.g., timing, reporting period, emission factor); emission factor road/sea/air travel; distance for known shipments along each step of the journey; use (e.g., sale/ownership) period duration for each phase of a total lifecycle; device energy consumption; grid energy carbon emissions; make/model specific emissions factors (e.g., some data published by OEMs); apportionment of emissions between lifecycle phases; scale (e.g., number of devices handled at the same time); and/or material consumed (e.g., replacement parts, disposable cleaning supplies (e.g., polishing compound)). In some embodiments, each of the foregoing listed types of data segment may be aggregated as described herein from multiple sources or based on data from multiple devices to produce a modeling data set (e.g., a machine learning training data set). In some embodiments, the system may use greater than or equal to 80 data segments for each model generation. In some embodiments, the system may use greater than or equal to 90 data segments for each model generation.

Each of the various data segments above maybe tracked and calculated using real-world data, such as material, power (e.g., electrical grid usage), GPS (e.g., shipping location and/or distance), and other collected data for each individual device or for an aggregated pool of devices (aggregated before or after segmentation of the data). In some embodiments, third party data and reports may be collected for use in the models and processes described herein. The data may be more or less granular (e.g., specific power supplies used by a certain municipality versus average power consumption by a device) depending on the available data and the model. For aspects such as transport, power, and the like, data from third parties may be integrated granularly into the modeling—such as distance between shipping locations, average fuel consumption of the transportation means, etc. Similarly, end-of-life calculations may be determined based on the preferred or actual disposal method for each sub-component of the overall device and associated pieces (e.g., packaging material), such as by calculating landfill and/or recycle emissions data. In some embodiments, resource usage data can be directly harvested from the devices themselves. For example, a computer system can programmatically connect with a device and/or repository comprising data from a device to determine (1) user usage data and profile data; (2) device usage data; (3) part wear and usage data; (4) diagnostic data; (5) model-specific data (e.g., IMEI) for subsequently retrieving stored data from a database; and/or (6) other data stored on or generated by the mobile device that may fall into or outside of one or more of the preceding categories, such as GPS position data, signal strength data, and the like. For example, a device's purchase, refurbishment, and/or sale locations may be captured and used for any of the modeling and analysis herein. Similarly, the specific geographic resource usage (e.g., carbon footprint) associated with various processes (e.g., disposal costs and recycling efficiency in Germany) may be considered.

Various resource usage related processes, methodologies, systems, devices, and the like discussed herein may be used in connection with one or more product workflows. For example, the various disclosures herein may be used in combination with mobile device solutions, extended service contracts, vehicle protection services, renters' insurance, lender-placed insurance products and other specialty products. Similarly, the various disclosures herein may be used in combination with different market segments including mobile carriers, tech support, trade-in, device upgrade, asset disposition, and reverse logistics. In some embodiments, resource usage (e.g., carbon impact calculations) may be performed based on one or more standards (e.g., British Standards Institute (2011), PAS 2050:2011, Specification for the assessment of the life cycle greenhouse gas emissions of goods and services; Greenhouse Gas Protocol (2001), Product Life Cycle Accounting and Reporting Standard.) which may be incorporated into the models and processes discussed herein.

The device data may be received from or otherwise in association with a plurality of devices. In some embodiments, the device data may be broken down into constituent parts, such as individual component or lifecycle stages, for subsequent aggregation to generate (e.g., train) models associated with the component(s) and/or lifecycle stages. In some embodiments, the device data may be aggregated, in whole or in part, based on a target device or devices (e.g., a device identifier received by the system). In such embodiments, the model may predict resource usage data and/or lifecycle efficiency of the target device or devices by aggregating and modeling device data having one or more overlapping data segments (e.g., shared characteristics) with the target device or devices. In such embodiments, the model may be trained without perfect matches between the data sources and the target device(s) by selecting data that is representative and sufficiently diverse to model the target device(s).

Data sources may comprise primary (e.g., directly measured from a device and/or supplied directly with the device) and secondary (e.g., provided by an OEM, industry analysis, or the like) data sources. In some embodiments, a combination of primary data sources and secondary data sources may be used. For example, primary data sources may be more accurate and closer to the intended modeling target, while secondary data may be more neutral and objective and may balance potential inaccuracies or biases in the primary data. In some embodiments, device resource usage data may be supplied in part from Original Equipment Manufacturers (OEMs). In some embodiments, published industry analysis, whitepapers, and/or the like may be reviewed and programmatically scraped for content (e.g., lifespan estimates, such as use period duration estimates). In some embodiments, data may be programmatically generated based on one or more known data sets. For example, transmission cost and/or energy usage costs may be calculated via known industry rates in combination with specific device information. For example, distance may be determined based on a map API call and/or GPS data. Such distance information may be combined with resource usage information (e.g., resource usage per mile) to determine the transmission period resource usage associated with one or more devices, components, solutions, and/or portions thereof. For modeling, each model may be generated using geographically and technologically representative data. In some embodiments, indirect data, such as Scope 3 emissions data, may be used in combination with the other device data to improve model performance. The Scope 3 activities may be ranked according to their impact on the modeled variables. In some embodiments, the data sources may comprise resource usage data, lifecycle efficiency data (e.g., including holistic efficiency data as well as or in the alternative lifespan impact metrics, lifespan data, and the like), or any other data value or portion thereof discussed herein.

Data quality may be scored and weighted for modeling purposes based on one or more criteria. Non-limiting examples of such criteria may include, but are not limited to, one or more of the following: technological representativeness, geographical representativeness, completeness, and/or reliability. The data quality criteria may weight the representativeness of the data in terms of technology, time, and geography and/or the quality of data measurements in terms of completeness and reliability (e.g., age). Data sources may be scored according to these criteria (e.g., assigned a grade of one to five) based on their closeness to the target device to be modeled.

Device data segments may additionally or alternatively be prioritized for aggregation and/or modeling according to several methods. Non-limiting examples of data prioritization include: influence (e.g., potential resource usage and/or lifecycle efficiency improvements that could be made by manipulating the particular data value, which may prioritize more important data); and risk (e.g., the potential for the device data segment to be particularly relevant to a user, provider, and/or third party, including the system or system provider). In some embodiments, data may be received and/or aggregated as individual segments representing a portion of a device data set for a plurality of devices. In some embodiments, a whole device data set for a plurality of devices may be received and/or aggregated.

In some embodiments, the aggregated data and/or modeling may be geographically based, with the device data being associated with or otherwise configured to generate one or more models that are directed toward a particular geographic area. The geographic location of the device data (for both training data and the target devices being modeled) may be determined via input, such as receiving a signal from a GPS sensor or other location detection mode. Models may be trained based on local resource usage information (e.g., energy usage and/or emissions in a particular region may be specific to that region). In some embodiments, the geographic data (e.g., GPS data) may be used by the model to determine the resource usage associated with a particular device. For example, location data may be used to predict one or more of the following data segments: raw resource usage (e.g., electricity usage, emissions, and/or the like); yearly average resource usage; yearly use-period resource usage; first use phase duration; first use phase resource usage; second use phase duration; second use phase resource usage; and/or the like. In some embodiments, any one or more of the foregoing data segment types (e.g., input factors) may be used for the resource usage and lifecycle efficiency modeling discussed herein. In some embodiments, any one or more of the foregoing data segment types (e.g., input factors) may be retrieved or determined using means other than geographic data.

The aggregated device dataset 420A-420N may be used to generate, configure, train, evaluate, update, and/or the like the one or more models 440A-440N. In some embodiments, a combination of the aggregated device data sets 420A-420N may be used to generate a model. In some embodiments, each model of the one or more models 440A-440N may be configured, trained, and/or the like for different modeling goals. In some embodiments, each model of a set of models may model a particular device component (e.g., processor, screen, etc.), where each model may be configured to generate resource usage data for a corresponding component. Additionally or alternatively, in some embodiments, each model of a set of models may model one or more lifecycle stages of a device, where each model in the set may be configured to generate resource usage data for a corresponding lifecycle stage of a device. Additionally or alternatively, in some embodiments at least one model may be configured to model resource usage for a device as a whole (e.g., including each lifecycle stage associated with the device). In some embodiments, a model framework (e.g., ensemble model) may be assembled from the one or more models.

In some embodiments, one or more of the model(s) 440A-440N generated by the modeling subsystem 108 (e.g., modeling engine 108B thereof) may comprise an intelligent model (e.g., Artificial Intelligence (AI)/machine learning model). In some embodiments, the one or more models 440A-440N may be generated using supervised learning, semi-supervised, unsupervised learning, reinforced learning, and/or the like. In some examples, such learning can occur offline, in a system startup phase/configuration phase, or could occur in real-time or near real-time during performance of the various processes described herein. The trained model(s) may comprise the results of clustering algorithms, classifiers, neural networks, and/or other modeling techniques. Additionally or alternatively, the trained model(s) may be trained to extract one or more features using pattern recognition, based on unsupervised learning, supervised learning, semi-supervised learning, reinforcement learning, association rules, learning, Bayesian learning, solving for probabilistic graphical models, among other computational intelligence algorithms that may use an interactive process to extract patterns from data. For example, a k-nearest neighbors algorithm may be used to train the models as a classifier for grouping the inputs for resource usage analysis. In some embodiments, a gradient descent (e.g., stochastic gradient descent) or another optimization algorithm may be used to optimize the resource usage or lifecycle efficiency or to perform the other optimization functions described herein.

One or more of the models may be configured, trained, and/or the like to generate resource usage data based on one or more input factors that directly or indirectly impact resource usage or are otherwise relevant for determining resource usage, such as a device identifier. For example, in some embodiments, the input factors may include one or more of device IMEI, device make/model of the device, country of origin of the device, country of destination of the device, packaging, repair option, refurbishment option, recycling method, repurposing process used for the device, resource usage associated with manufacturing and transmitting the device, device manufacturer, resource usage data associated with device model, resource usage data associated with the device lifecycle stages (which may include use periods and end of life), device weight, resource usage associated with the manufacture of the device, user identifier, and/or other input factors. In each instance, the input factors may be based on data segments that have been aggregated and used for modeling in accordance with the various embodiments discussed herein.

In some embodiments, the granularity of the resource usage data output or any other outputs described herein of the one or more models may depend on the granularity of the input factors (e.g., the one or more data segments). For example, in some embodiments, the one or more models may be configured, trained, and/or the like to generate resource usage data based on any number of input factors, where the number and/or specificity of input factors provided or otherwise available to a model may vary. The granularity of the resource usage data output may correspond to the number of input factors leveraged by the model to generate the resource usage data. For example, in some embodiments, the model may be called to provide resource usage data for a specific device (e.g., by individual IMEI), and the resource usage data output may comprise a modeled resource usage for the specific device based on the available input factors of data for the model (e.g., if location, channel, make, model, etc. data are all available for the specific device, the model includes all available data points in its determination of resource usage).

In some embodiments, the one or more models may be configured to output a level of granularity corresponding to input factors having various levels of specificity covering one or more groups of devices (e.g., all phones of a particular make, all phones of a particular model, all phones of a particular region, and/or combinations thereof). In such embodiments, the one or more models may be configured to output resource usage data corresponding to the level of granularity given. The data segments (e.g., input factors) used by the one or more models may be aggregated modularly to generate a model and/or output capable of modeling any combination of features at any level of granularity.

In some embodiments, the one or more models may be configured to output more granular data than is received via input. For example, in one example, the one or more models may infer or otherwise approximate one or more other input factors, for example, based on similar devices, similar device components, average device/components, and/or relevant data available by the model. In another example, such as when the number of input factors is limited, the one or more models may determine the resource usage data associated with a device or group of devices (e.g., an average resource usage across several different devices corresponding to the input factor data segments) based on resource usage associated with a similar device and output the approximate resource usage associated with the requested device.

In some embodiments, the one or more models 440A-440N may be configured, trained, and or the like to correlate input factor(s) provided to the respective model to one or more other input factors and/or determine the other input factors based on the input factor(s) provided to the model. For example, in some embodiments, the one or more models 440A-440N may be configured to receive a device identifier (e.g., one or more items of data by which a device or group of devices may be uniquely identified) corresponding to a device and/or group of devices, and generate resource usage associated with the device and/or group of devices based on the device identifier. In some embodiments, the one or more models may be configured to extract one or more features from the device identifier and identify other input factors for the device or group of devices based on the one or more features and/or correlate the device identifier to other input factors based on the device identifier. For example, in some examples, a model may be configured to determine resource usage associated with a particular device make/model by identifying the device make/model based on the device identifier provided to the model. The model may be configured to identify, from a database and based on the device identifier, the resource usage data and/or lifecycle efficiency data according to the embodiments discussed herein. As described above, a device identifier may comprise any number of data items that identifies a subset of devices from a population of devices. For example, in some embodiments, the device identifier may comprise a string corresponding to a full name of the device (e.g., Apple iPhone 11 Pro Max 256 GB) or another identifier (e.g., IMEI, device make, device model, etc.) from which the device information can be determined.

Generating and Applying Resource Usage Data

Figure 5:
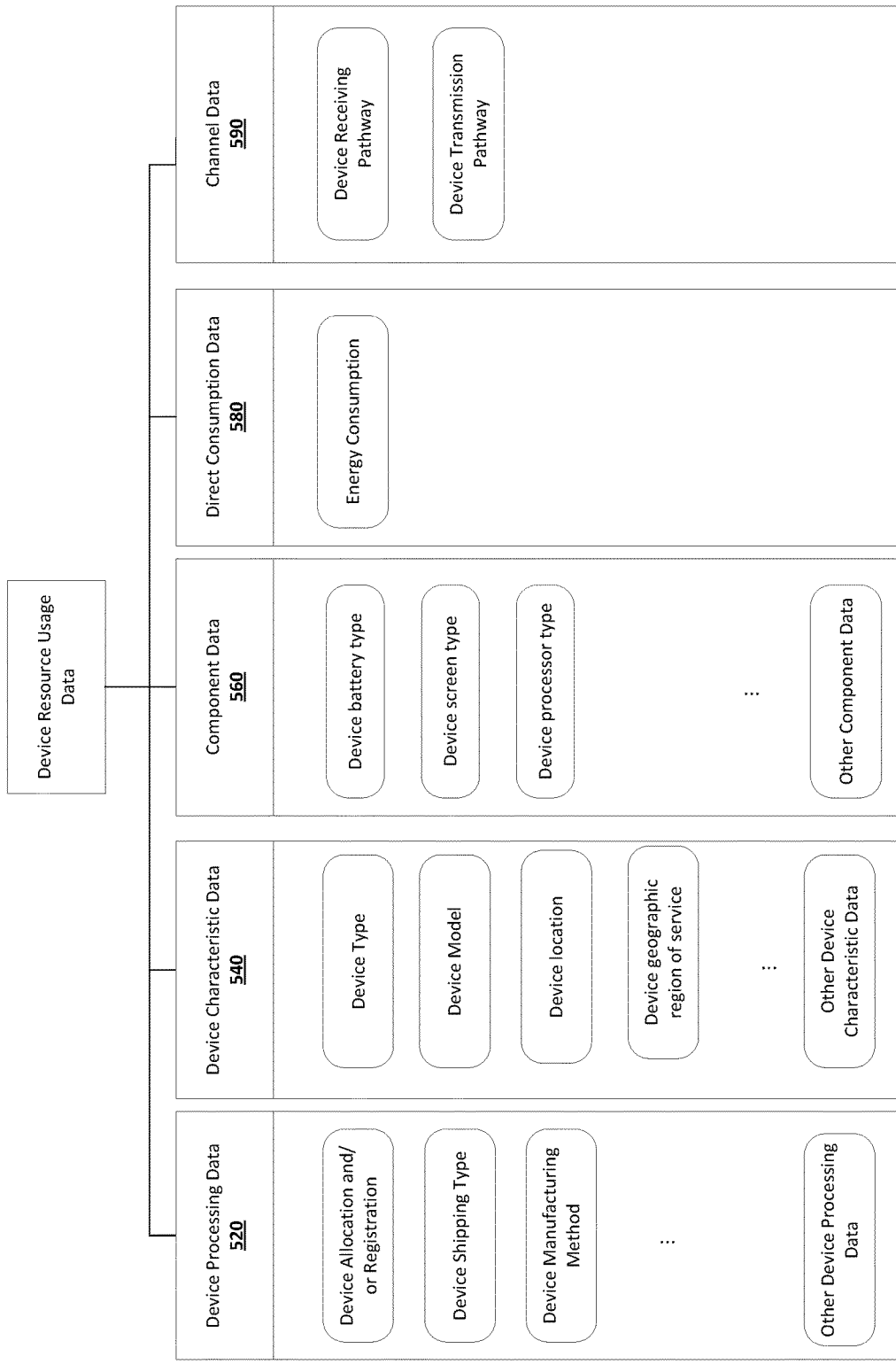
FIG. 5 illustrates an example device data segments associated with a device in accordance with an example embodiment of the present disclosure.

FIG. 5 illustrates an example device data segments associated with a device in accordance with an example embodiment of the present disclosure. In some embodiments, resource usage data for a device may be determined based on device data associated with the device. In some embodiments, device data for a device includes data generated by the device and data generated about the device. Device data may include one or more device data segments that describes device data associated with a device or a portion thereof, including a device lifecycle or portion thereof. In some embodiments and as depicted in FIG. 5, non-limiting examples of device data segments of device data may include one or more of device processing data 520, device characteristic data 540, component data 560, direct consumption data 580, and/or channel data 590.

In some examples, device processing data may include device allocation and registration, device shipping type, device manufacturing method, and/or the like. In some examples device characteristic data may include device type, device model, device location, device geographic region of service, and/or the like. In some examples, component data may include device battery type, device screen type, device processor type, and/or the like. In some examples, direct consumption data may include actual and/or predicted energy consumption of the device. In some examples channel data may include a pathway from which a device may be received or into which a device may be transmitted for disposition and/or various data associated therewith. It should be understood that the foregoing are provided as non-limiting example, and some embodiments may include other device data segments and/or may not include some of the above device data segments. Moreover, the aforementioned device data segments may include additional data elements or may exclude one or more described data elements. Possible channels for device reuse (e.g., 2nd and subsequent ownership/sale phases) may include, but are not limited to, resale (C2C, C2B2C, B2C, etc.); trade-in; repair/insurance; upgrade; etc. In some embodiments, refurbishment may be limited to cosmetic reconditioning, while in some embodiments, refurbishment/repair may include repairing and/or replacing various components of the devices. Devices may also be graded and/or otherwise diagnosed as part of this process. The result of the grading/diagnosis may be combined with the modeling to determine subsequent distribution channels and device handling.

In some embodiments, one or more models may be leveraged to determine resource usage based on each device data segment associated with the device data for the device (e.g., device data available for the device). For example, a model may be configured to predict resource usage for a device or a portion thereof, based on one or more of device allocation and/or registration, device shipping type, device manufacturing method, device type, device model, device location, device geographic region of service, device battery type, device screen type, device processor type, energy consumption, device receiving pathway, and/or other device data segments. In some embodiments, a device data segment may comprise one or more input factors that can be leveraged by a model to determine resource usage and/or other outputs of the model. For example, in some embodiments, each model may be configured to generate resource usage data based on one or more input factors (also referred to herein as input variables), where a given input factor may be associated with one or more device data segments. In some embodiments, a model may be provided with one or more input factors and may be configured to correlate, map, or otherwise determine one or more other input factors based on the one or more input factors provided to the model.

Figure 6A:
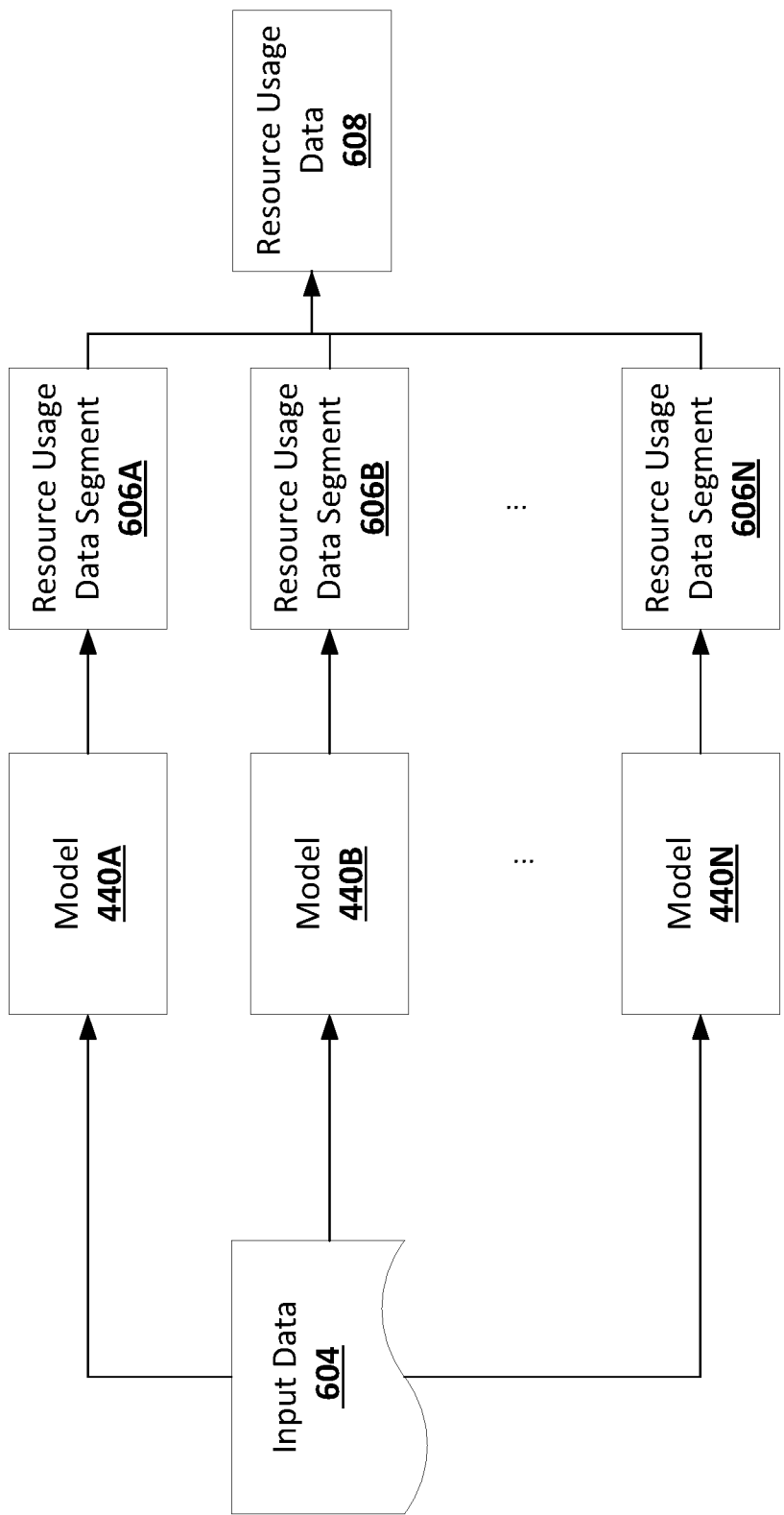
FIGS. 6A-6B illustrate example flow diagrams for generating resource usage data in accordance with example embodiments of the present disclosure.
Figure 6B:
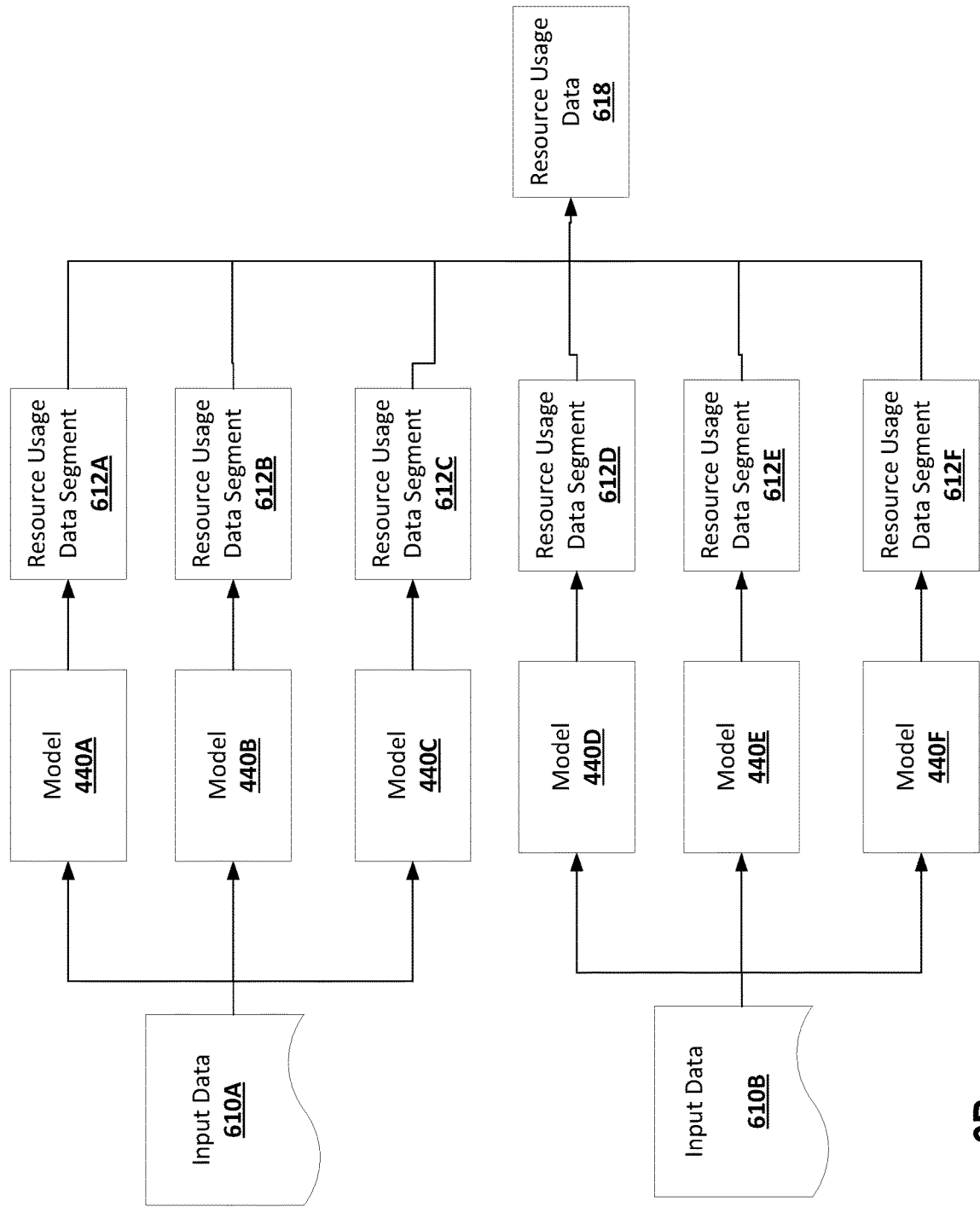

FIGS. 6A-6B illustrate example flow diagrams for generating resource usage data in accordance with example embodiments of the present disclosure. The depicted embodiment may facilitate prediction and/or determination of the total resource usage associated with a device over its lifetime or over a portion thereof. As depicted, the example embodiment receives input data (e.g., a device identifier comprising one or more of an IMEI, make/model, and/or other device identifiers), and models resource usage data segments associated with a portion of the resource usage data, which segments may then be assembled into the final resource usage data. In some embodiments, the resource usage data 608 may be generated with a single model. Similarly, the one or more models 440A-440N may be substituted with any one or more algorithms or processes for calculating a resource usage data for a particular device (e.g., at an IMEI level, a SKU level, a geographic region and make/model level, or another level of granularity) based on the input data.

As depicted in FIG. 6A, input data 604 (e.g., a device identifier and/or other input data) may be provided to one or more models 440A-440N. Upon receiving the input data, each of the one more models 440A-440N may generate a resource usage data segment 606A-606N for the device based on the input data. As depicted in FIG. 6A, the system 100 (depicted in FIG. 1) may assemble resource usage data 608 for the device based on the resource usage data segments 606A-606N.

In some embodiments, the system 100 may be configured to determine resource usage data for a device based on resource usage data associated with individual components of the device. In some such embodiments, the system 100 may assemble resource usage data 608 (e.g., total resource usage associated with a device over its lifetime or over a portion thereof) from a plurality of modeling processes based around subsets of the overall device, including but not limited to individual components. For example, the system 100 may employ separate modeling processes for individual components, such as a model for the battery and a model for the screen using inputs identifying each separately, such that each unique device may be assessed as a sum of the models of one or more sub parts. In some embodiments, components making up less than a threshold amount of the total resource usage or total value of the device may or may not be modeled, or may be modeled in aggregate. In an example, the system 100 may employ separate modeling processes for other discrete segments associated with a device, such as a particular lifecycle stage (e.g., a first use period, a second use period, a manufacturing period, one or more transportation periods, one or more device triage periods, a recycling and/or end-of-life period, or the like) or another incremental segment (e.g., transportation method, geographic region, etc.).

As depicted in FIG. 6B, input data 610A (e.g., each comprising a first component identifier and/or other input data) may be provided to a first set of models 440A-440C, and input data 610B (e.g., comprising a second component identifier and/or other input data) may be provided to a second set of models 440D-440F. Upon receiving the input data 610A, each of the models 440A-440C may generate resource usage data segment 612A-612C for the corresponding component. Upon receiving the input data 610B, each of the models 440D-440F may generate one or more resource usage data segments 612D-612F for the corresponding component. As depicted in FIG. 6, the system 100 may assemble resource usage data 618 for the device based on the resource usage data segments 612A-612F, which may represent a targeted, granular resource usage data determination for the total device lifecycle or any portion thereof.

Figure 7A:
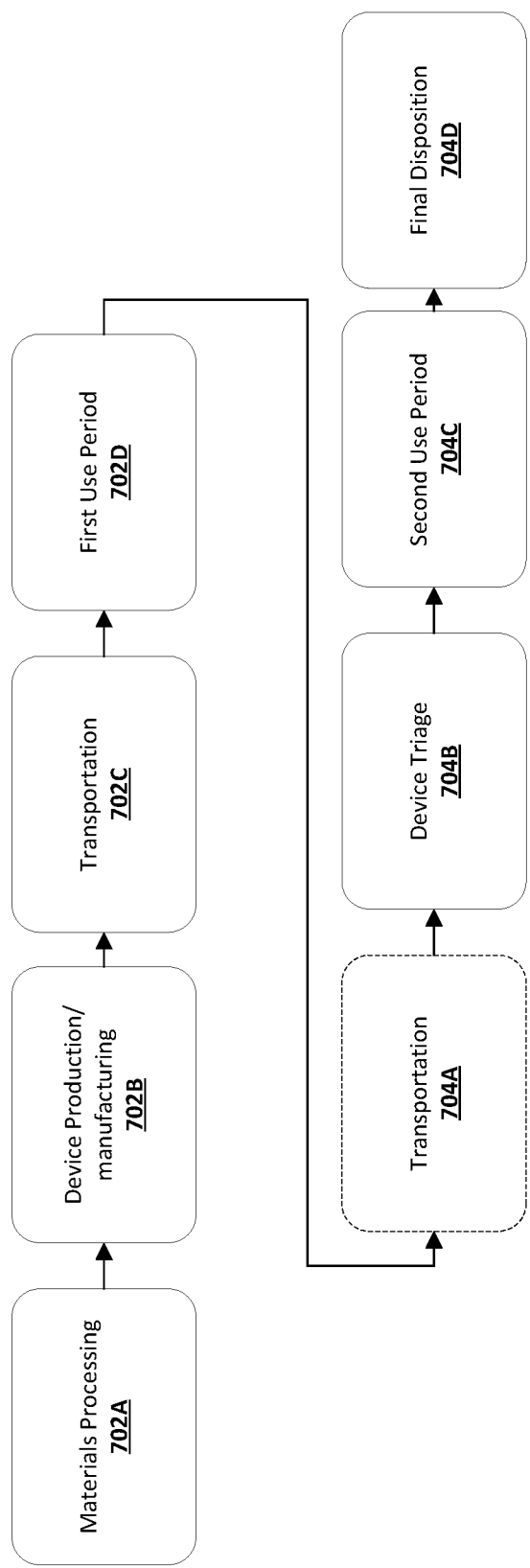
FIG. 7A-7C illustrates example flowcharts depicting operations performed in accordance with an example embodiment of the present disclosure.

In some embodiments, the system 100 may be configured to predict resource usage data for a device with respect to the lifecycle of the device or individual lifecycle stages of the device. FIG. 7A, depicts an example lifecycle of a mobile device comprising a first lifecycle 702A-702D and a second lifecycle 704A-704D. As depicted in FIG. 7A, the first lifecycle stage may include, as non-limiting examples, materials processing lifecycle stage 702A, device production/manufacturing lifecycle stage 702B, transportation lifecycle stage 702C, and first use period lifecycle stage 702D. As further depicted in FIG. 7A, the second lifecycle stage may include, as non-limiting examples, transportation lifecycle stage 704A, device triage lifecycle stage 704B (e.g., corresponding to a triage period, or otherwise including defect detection and solution implementation, which detection and solution may optionally include physical modifications or electronic modifications to the device or may optionally include simple analysis and allocation of the device to a subsequent use period and/or end-of-life disposition period), second use period lifecycle stage 704C, and final disposition lifecycle stage 704D. In various implementations and as depicted in FIG. 7A, a mobile device may include one or more use periods (e.g., first use period 702D, second user period 704C, etc.), where each use period may be associated with one or more lifecycle stages. For example, the most basic lifecycle of a mobile device may be a single-use lifespan whereby a device is used for a first use period (e.g., initial period, also referred to as a first use period) by a first device owner after manufacturing of the device. After this first use period, some users may discard or recycle their device and acquire (e.g., purchase, trade-in, etc.) a new device. In some instances, device trade-in, repair, refurbishment, and similar solutions may allow devices to be exchanged for new or used devices while the user's original device is repurposed for additional use period (e.g., second use period, third use period, etc.). In some instances, absent the optimized resource usage calculations and lifecycle efficiency modeling described herein, a device may be recycled before its useful life expires and/or additional resources may be wasted.

Adding a second use period may cause the lifecycle efficiency prediction data associated with a device to improve. For example, the resource usage data associated with various lifecycle stages (e.g., manufacture through the first use period) may have a relatively higher resource usage than the second use period, such that adding a second use period may effectively allocate or prorate the resource usage of the device across a longer time period (e.g., lifespan) for a greater lifecycle efficiency. By way of non-limiting example, if manufacture through first use period of a first device requires 100 lbs of carbon and/or 10 kWh; a device triage period (e.g., diagnosis and solution of a defect) requires 10 lbs of carbon and/or 1 kWh; a second use period of the device requires 20 lbs of carbon and/or 2 kWh; and an end-of-life process for the device requires 5 lbs of carbon and/or 0.5 kWh; directing triage period and a second use period may have the effect of spreading or diluting the resource usage of the initial period out over a longer lifespan, which may cost more net resource usage while providing improved lifecycle efficiency.

In some embodiments, the system 100 may be configured to optimize the lifespan of a device, whereby resource usage associated with the device or otherwise allocated to the device, or a group of devices is optimized (e.g., minimized). The system 100 may leverage resource usage data and/or lifecycle efficiency predictions (e.g., lifecycle efficiency prediction data) to optimize the lifespan of a device. In some embodiments, optimizing the lifecycle of a device or otherwise minimizing resource usage associated with a device comprises programmatically selecting one or more solutions from candidate solutions (e.g., repair, refurbish, replace, etc.) for the device following a use period of the device (e.g., first use period, second use period, etc.). The system 100 may be configured to diagnose one or more defects with a device and/or select the one or more solutions based on resource usage data and/or lifecycle efficiency predictions associated with the solutions. The system 100 may leverage one or more models configured to generate the resource usage data and/or lifecycle efficiency prediction data, as described above.

In some embodiments, lifecycle efficiency prediction comprises data (e.g., score, metric, and/or the like) indicative of the efficiency of a solution that may implemented for a device following a use period of the device. Lifecycle efficiency prediction data may include a data representing a resource usage per unit lifespan. For example, lifecycle efficiency prediction data may correspond to a programmatically determined assessment of one or more solutions that considers more than the absolute resource usage, and may include the resource usage per unit lifespan added as a result of the solution. For example, a solution with very low resource usage may have a lower lifecycle efficiency prediction than a solution with high up-front resource usage if the additional lifespan created by the solution outweighs the up-front resource usage (e.g., as compared to recycling and replacing a device). In some embodiments, the lifecycle efficiency may be calculated on a per-unit-time basis (e.g., annualized resource usage, average annual resource usage, or any other temporal basis).

Figure 7B:
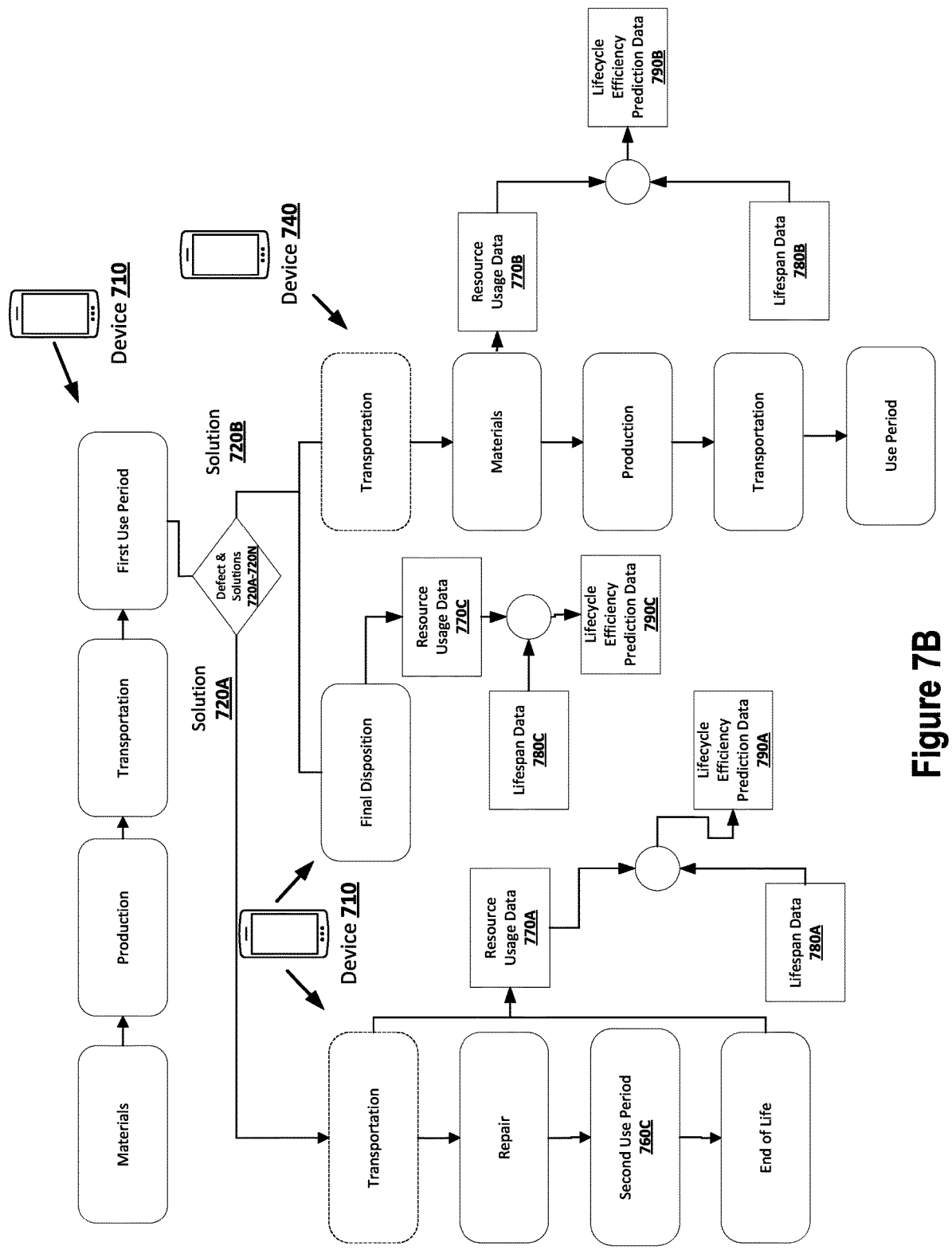

FIG. 7B depicts example process flow for determining lifecycle efficiency for a device associated with a user (e.g., customer). The system 100, identifies one or more solutions 720A—720N for the device 710 subsequent to a first use period of the device 710. As a non-limiting example and as depicted in FIG. 7B, the one or more solutions may include a first solution 720A that is a repair solution and a second solution 720B that is replace solution. Each solution may be associated with a subsequent lifecycle that may or may not include a use period. The first solution 720A (e.g., repair solution) may comprise repairing defects associated with the device and programmatically triggering a second use period 760C for the device 710. The second solution 720B may comprise replacing the device 710 with a second device 740 (e.g., new device 740), programmatically triggering a first use period for the second device 740, and determining an end of life disposition for the device 710. The system 100 may determine resource usage data associated with the each of the solutions 720A-720N (e.g., first solution 720A, second solution 720B, etc.) using or more models, such as models 440A-440N described above. In some embodiments, the system 100 may select a solution for the device from the solutions 720A-720N based on the resource usage data associated with the solutions for the device. In some embodiments, the system 100 may determine, using one more models, such as a lifecycle efficiency prediction model (which may be one or more of models 440A-440N or may be applied as an additional layer with the resource usage data as an input) lifecycle efficiency prediction data for each solution, and select a solution based on the lifecycle efficiency prediction data.

In some embodiments, the system 100 may determine lifecycle efficiency prediction data for a device with respect to a give solution based on resource usage data for the solution and lifespan data associated with at least one subsequent use period of the device. In some embodiments, lifespan data may comprise data that is indicative of actual or expected (e.g., predicted) length of life of a device or a portion thereof. For example, lifespan data may include data that is indicative of an actual or expected average length of time and/or maximum length of time that a device and/or a device component is functional, free of defects, and/or otherwise usable or suitable for one or more purposes. In some examples, lifespan data may comprise a time interval defined by a use period start timestamp and a use period end timestamp. In some instances, lifespan data may be measured in one or more segments (e.g., segments associated with one or more lifecycle stages). In some embodiments, lifespan data may comprise a lifespan impact metric for each solution of a plurality of solutions, where lifespan impact metric may describe how much the lifespan of a device and/or device component can be altered based on a solution (e.g., the net increase in lifespan of the device or segment thereof).

Figure 7C:
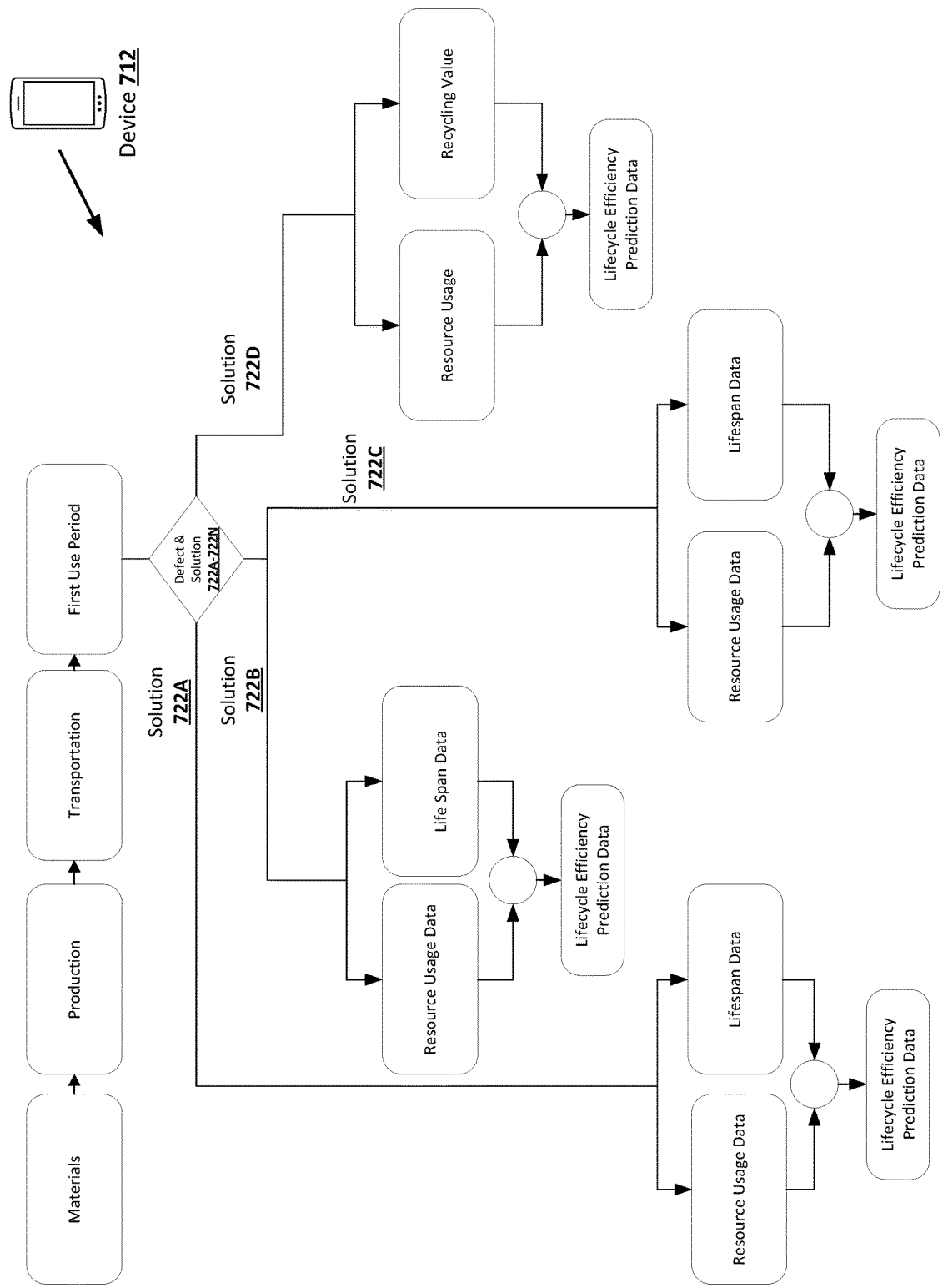

While FIG. 7B shows an example flow from the perspective of a customer (or system operating on behalf of a customer) choosing a resource efficient action following a first use period, FIG. 7C depicts example process flow for determining lifecycle efficiency for a device that may not currently be associated with a user (e.g., customer) or that otherwise operates from the perspective of the device itself, such as a device obtained via trade-in or acquired via other means, and such as may be performed by a system configured to optimize the resource usage of a particular device. The system 100, identifies one or more solutions 722A-722N for the device 712 subsequent to a first use period of the device 712. As a non-limiting example both of individual solutions and combinations of example solutions and as depicted in FIG. 7C, the one or more solutions may include a first solution 722A that is a first repair solution, a second solution 722B that is a second repair solution, a third solution that is a reuse solution, and a fourth solution 722D that is a final disposition solution. Each solution may be associated with a subsequent lifecycle stage that may or may not include a use period.

By way of non-limiting examples that may be used individually or in any combination or subcombination, four solutions 722A, 722B, 722C, and 722D are shown in FIG. 7C. The first solution 722A (e.g., first repair solution) may comprise repairing defects associated with the device and programmatically triggering a second use period for the device 712 (e.g., offering the item for resale, as a trade-in device, reusing the device, or otherwise initiating a second use period). The second solution 722B (e.g., second repair solution) may comprise repairing defects associated with the device and programmatically triggering a second use period for the device 712. The first solution 722A and the second solution 722B may comprise different repair options for the device. The third solution 722C (e.g., reuse solution) may comprise reusing the device 712 without repair and programmatically triggering a second use period for the device 712. The fourth solution 722D may comprise a final disposition for the device 712, such as recycling the device 712, destroying the device, or otherwise proceeding with end-of-life disposition. The system 100 may determine resource usage data associated with the each of the solutions 722A-722N (e.g., first solution 722A, second solution 722B, third solution 722C, fourth solution 722D, etc.) using or more models, such as models 440A-440N described above. In some embodiments, the system 100 may select a solution for the device 712 from the solutions 722A-722N based on the resource usage data associated with the solutions for the device 712. In some embodiments, the system 100 may determine, using one more models, such as a lifecycle efficiency prediction model (which may include one or more of models 440A-440N) lifecycle efficiency prediction data for each solution, and select a solution based on the lifecycle efficiency prediction data.

In some implementations, to optimize resource usage, the system 100 may be configured to programmatically select a solution that extends the lifecycle of a device with minimum resource usage per unit lifespan added relative to other solutions or associated with optimal lifecycle efficiency relative to other solutions.

Example Methods

Figure 8:
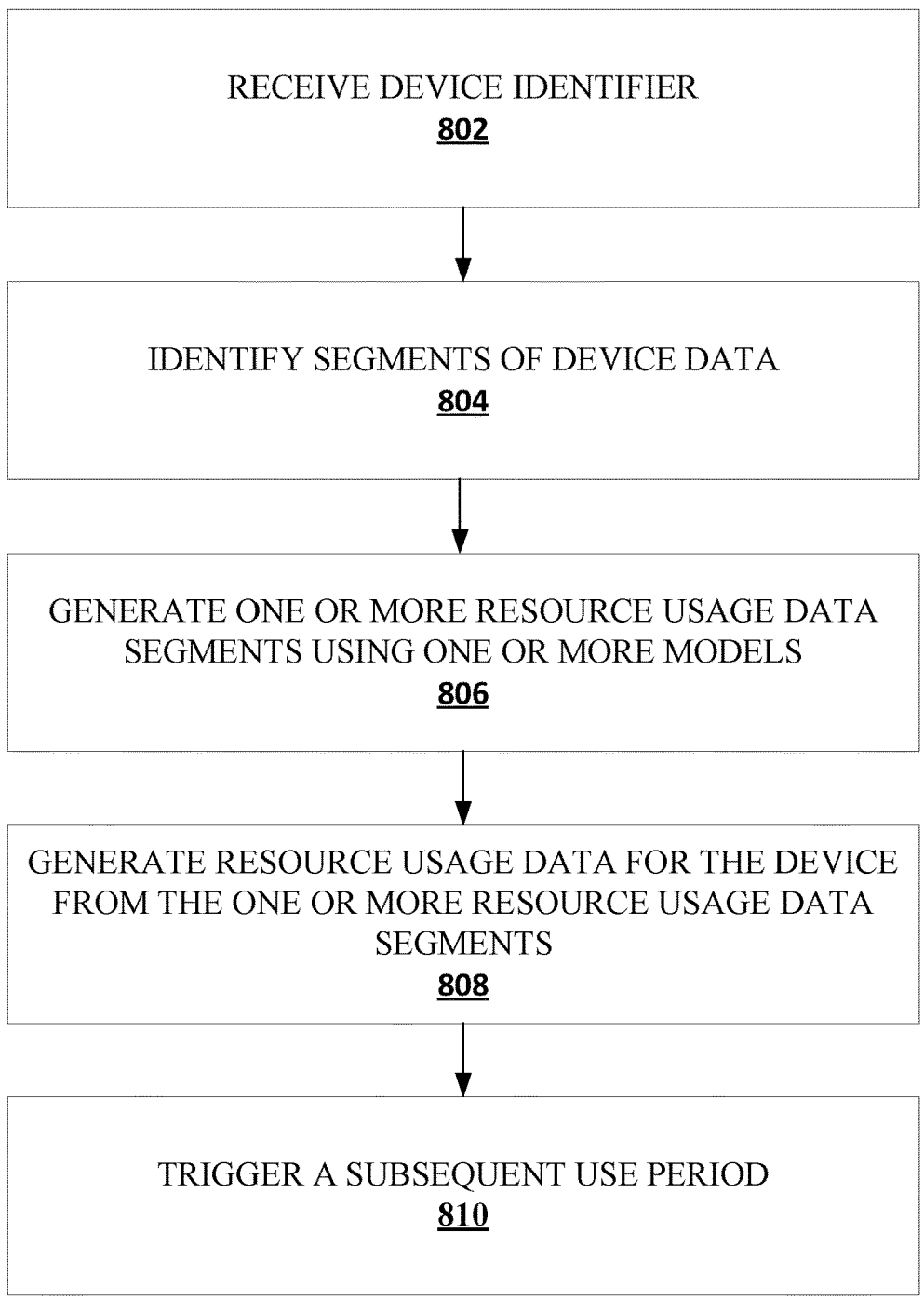
FIG. 8 illustrates an example flow chart for generating resource usage data and determining disposition for a device in accordance with an example embodiment of the present disclosure.

FIG. 8 illustrates an example flow chart for generating resource usage data for a device. As depicted at block 802, the process 800 begins with receiving a device identifier associated with a request data object. In some embodiments, the request data object may be transmitted from a client device. The request data object may include a wide range of data and may be expressed in any format that allows for the transmission of a request data object from the client device to one or more models and/or systems. In some embodiments, a request data object may include a device identifier and/or other data that may be used by one or more models to generate resource usage data for a device and/or other data relevant for fulfilling the request associated with the request data object. In some embodiments, the request data object may include an indication of the identity of a user associated with the device.

At block 804, the process 800 continues with the identification of a plurality of segments of device data associated with the mobile device. The device data segments may include device processing data (e.g., device allocation and registration, device shipping type, device manufacturing method, and/or the like); device characteristic data (e.g., device type, device model, device location, device geographic region of service, and/or the like), which may include component data (e.g., device battery type, device screen type, device processor type, and/or the like); direct consumption data (e.g., actual and/or predicted energy consumption of the device); and/or channel data (e.g., a pathway from which a device may be received or into which a device may be transmitted for disposition and/or various data associated therewith). Device data segments may be or may include resource usage data associated with a device or device lifecycle, including portions thereof.

At block 806, the process 800 continues with the generation of one or more resource usage data segments for one or more of a plurality of segments of the device data using one or more models. In some embodiments, the one or more resource usage data segments comprises at least two resource usage data segments, where a first resource usage data segment of the at least two resource usage data segments is generated using a different model that is trained using different aggregated device data set relative to a second resource usage data segment. In some embodiments, the one or more models are trained using aggregated device data sets from a plurality of devices that comprise two or more different devices. In some embodiments, the aggregated device data sets comprise data retrieved from a plurality of data sources along the lifecycle of each of the plurality of devices.

At block 808, the process 800 continues with the generation of resource usage data for the device from the one or more resource usage data segments.

At block 810, the process 800 continues with the triggering of a subsequent use period of the device by directing disposition of the device based on the resource usage data. In some embodiments, the subsequent use period comprises linking the device with a subsequent user account. In some embodiments, the device may be associated with at least one defect, where the at least one defect may be resolved with a solution selected from a plurality of solutions based on a lifecycle efficiency prediction data for each solution of the plurality of solutions.

Figure 9:
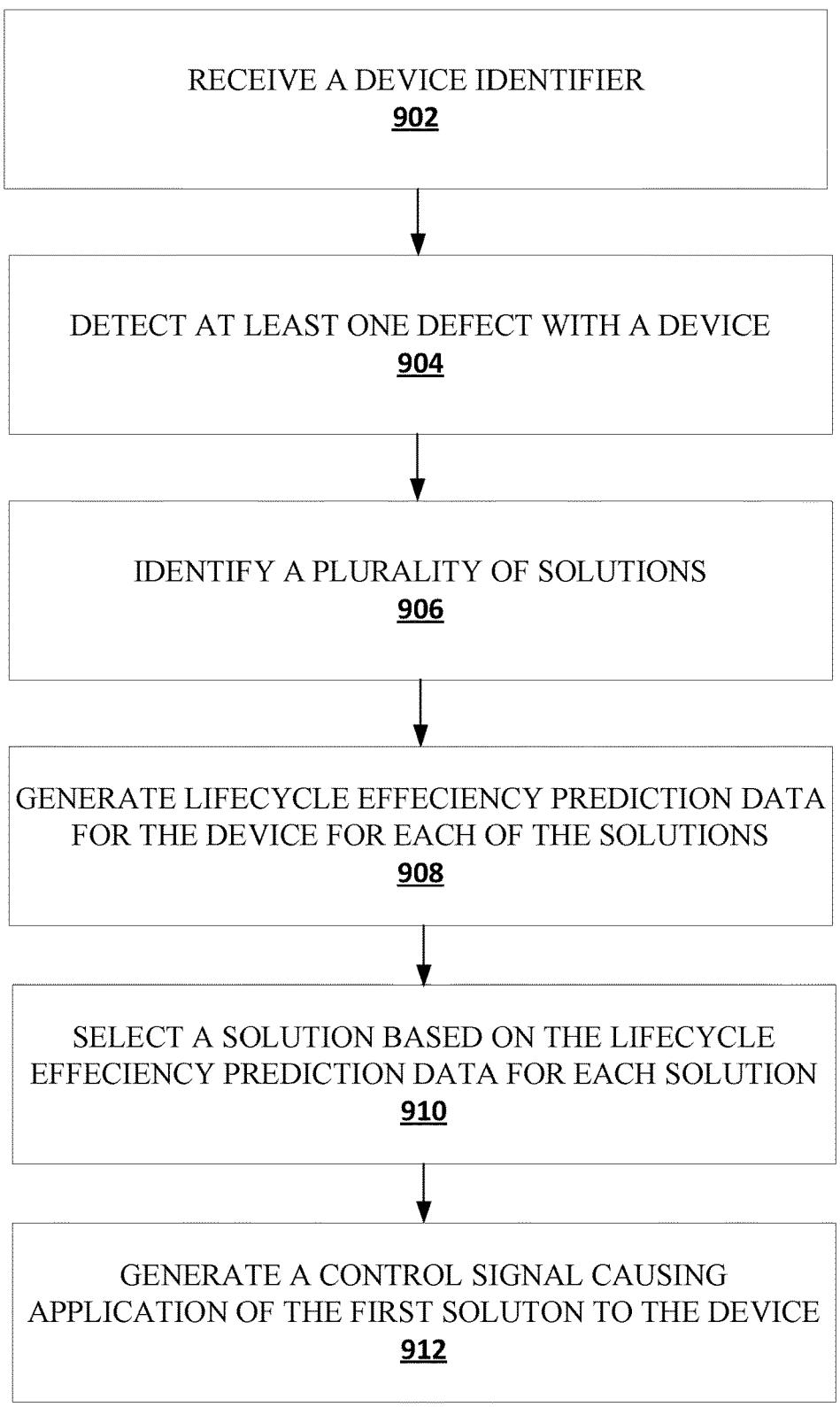
FIG. 9 illustrates an example flow chart for determining a solution for a device in accordance with an example embodiment of the present disclosure.

FIG. 9 illustrates an example flow chart for determining a solution for a device in accordance with an example embodiment of the present disclosure.

As depicted, at block 902, the process 900 begins with receiving a device identifier corresponding to a device. In some embodiments, the request data object may be transmitted from a client device. The request data object may include a wide range of data and may be expressed in any format that allows for the transmission of a request data object from the client device to one or more models and/or systems (e.g., system 100). In some embodiments, a request data object may include device data. In some embodiments, the device data may include a device identifier and/or other data that may be used by one or more models to generate resource usage data for a device and/or other data relevant for fulfilling the request associated with the request data object. In some embodiments, the request data object may include an indication of the identity of a user associated with the device. In some embodiments, the system 100 may be electrically connected with the device to receive the request data object (e.g., device data thereof). For example, in some embodiments, the request data object (e.g., device data thereof) or a portion thereof may be received from the device via the electronic connection of the system 100 with the device.

At block 904, the process 900 continues with detecting at least one defect with the device following a use period of a plurality of use periods of the device. The at least one defect may comprise any actual and/or perceived imperfection, fault, abnormality, and/or similar terms, that impairs the quality, function, utility, and/or appearance of device. For example, the at least one defect may comprise any feature that makes the device less than "like-new" quality, including mechanical faults (e.g., stuck camera lens, electrical faults (e.g., faulty hardware and/or hardware performing substandard, such as a reduced battery capacity, faulty or broken touch screen, non-functioning camera, or the like), software faults (e.g., operating system errors, application crashes, lagging, etc.), cosmetic imperfections or damage (e.g., broken glass, cracks, scratches, chips, or the like), and/or the like. In some examples, the at least one defect may be associated with one or more components of a device, including hardware components and non-hardware components. In some embodiments, the at least one defect may be resolved with one or more solutions.

In some embodiments, the at least one defect may be determined (e.g., programmatically diagnosed) based on electronic data and/or captured images of the device (e.g., using a camera embodied by the system 100 or otherwise associated with the system 100).

At block 906, the process 900 continues with identifying a plurality of solutions for the at least one defect. The plurality of solutions may include remote resolution (e.g., remotely repaired via software update), onsite resolution (e.g., physical or electronic resolution at a device support location), a combination thereof, and/or the like. In some embodiments, a solution may include a disposition of the device (e.g., sale or recycling) and/or no modification to the device. In some examples, a solution may include a channel selection, such as programmatically matching a solution and a state of the device following the solution with the quality of device accepted by one or more channels (e.g., "like-new" devices may be resold in a retail location, "functioning, good condition" devices may be directed to a wholesaler, etc.).

At block 908, the process 900 continues with generating, using one or more models and based on the device identifier and the at least one defect, lifecycle efficiency prediction data for the device for the plurality of solutions for the at least one defect. In some embodiments, the device lifespan data comprises a lifespan impact metric data object for each of the plurality of solutions for the at least one defect, where the lifespan impact metric may describe how much the lifespan of a device and/or device component can be altered based on a solution. In some embodiments, the predictive resource usage data for each of the plurality of solutions for the at least one defect comprises the resource usage for the mobile device over the at least one subsequent use period for the respective solution.

In some embodiments, generating lifecycle efficiency prediction data for the device for the plurality of solutions comprises applying predictive resource usage data for each solution for the at least one defect and device lifespan data associated with at least one subsequent use period of the plurality of use periods of the device to the one or more models. In some embodiments, the one or more models may be configured to generate the predictive resource usage data for each solution of the plurality of solutions. Additionally or alternatively the one or more models may be configured to generate the device lifespan data associated with the at least one subsequent user period.

In some embodiments, the one or more models are configured to generate the lifecycle efficiency prediction data for each solution by generating, a resource usage score for each solution based on the resource usage data associated with the respective solution, and comparing the resource usage score for each solution with the device lifespan data. In some embodiments, the one or more models are configured to generate the lifecycle efficiency prediction data for each solution by generating, a resource usage score for each solution based on the resource usage data associated with the respective solution, and comparing the resource usage score for each solution with the device lifespan data. In some embodiments, the one or more models are machine learning models trained using aggregated device data sets from a plurality of devices comprising two or more different devices. In some embodiments, the one or more models comprise at least one neural network. In some embodiments, the device lifespan data comprises a lifespan impact metric data object for each of the plurality of solutions for the at least one defect. As described herein, lifespan impact metric may refer to a data entity that describes how much the lifespan of a device and/or device component can be altered based on one or more particular solutions.

At block 910, the process 900 continues with selecting a first solution of the plurality of solutions based on the lifecycle efficiency predictions. In some embodiments, selecting the first solution of the plurality of solution comprises programmatically ranking the plurality of solutions based on the lifecycle efficiency prediction data associated with each solution of the plurality of solutions for the at least one defect, and in response to determining that the first solution is associated with an optimal lifecycle efficiency prediction data, wherein the optimal lifecycle efficiency prediction data corresponds to a minimum resource usage per unit time of the plurality of solutions, automatically selecting the first solution. In some embodiments, the first solution comprise a carbon minimized solution, where the carbon minimized solution comprises a carbon consumption per unit time less than any other of the plurality of solutions. In some embodiments the first solution may be selected further based on a grade of the device. For example, in some embodiment, the process 900 may include determining a grade for the device, and selecting the first solution based on the grade of the device. In some embodiments, selecting the first solution of the plurality of solutions comprises receiving user input indicative of the first solution of the plurality of solutions based on the lifecycle efficiency predictions, and programmatically selecting the first solution. Additionally or alternatively, in some embodiments, the first solution may be further selected based on a grade of the device. For example, in some embodiments, the device may be analyzed, inspected, and/or the like to determine a grade for the device, where the grade of the device may be a factor considered in selecting the first solution or otherwise considered by the one or more models.

At block 912, the process 900 continues with generating a control signal causing application of the first solution to the device to resolve the at least one defect in response to the selection and generating an updated device. For example, where the resource usage comprises carbon consumption, a control signal may cause application of the carbon minimized solution to the device to resolve the at least one defect by transmitting a signal configured to initiate replacement of at least one component of the mobile device with at least one replacement component. In some embodiment, a control signal may be generated that causes a renderable data object comprising one or more of the resource usage data, the device lifespan data, or the lifecycle efficiency prediction data for one or more of the plurality of solutions to be displayed on a user interface of a client device.

Figure 10:
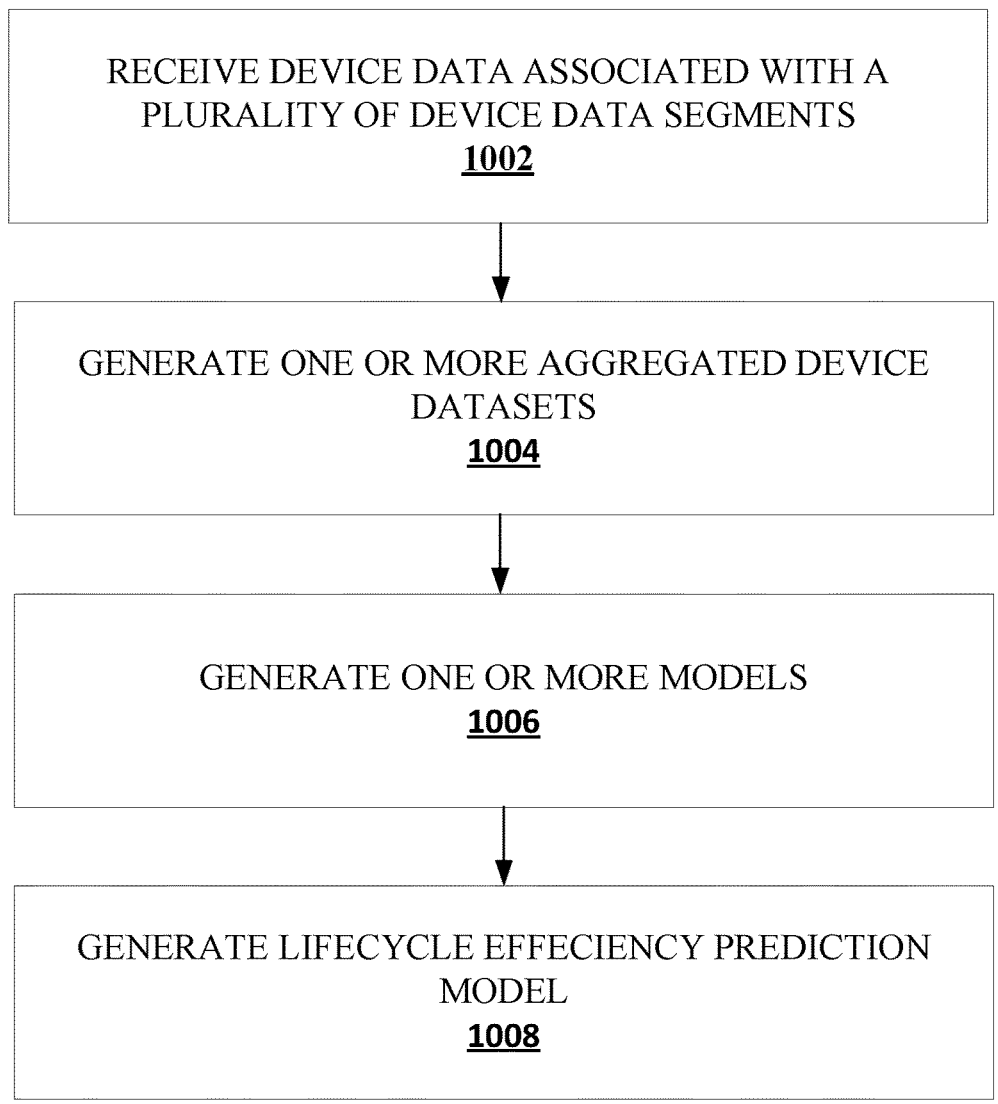
FIG. 10 illustrates an example flow chart for generating a lifecycle efficiency prediction model in accordance with an example embodiment of the present disclosure.

FIG. 10 illustrates an example flow chart for generating a lifecycle efficiency prediction model in accordance with an example embodiment of the present disclosure.

As depicted, at block 1002, the process 1000 begins with receiving device data associated with a plurality of devices. The device data may include a plurality of device data segments associated with a plurality of device data for the plurality of devices. In some embodiments, the plurality of devices includes two or more different devices with one or more different device data.

The process 1000 continues at block 1004 with generating one or more aggregated device data sets. Each aggregated device data set may comprise matching segments of device data associated with device data of two or more of the plurality of devices, including the two or more different devices;

The process 1000 continues at block 1006 with generating one or more models based on the aggregated device data sets. The one or more models may be configured to generate one or more resource usage data segments associated with the device data.

The process 1000 continues at block 1008 with generating a lifecycle efficiency prediction model comprising the one or more models. The lifecycle efficiency prediction model may be configured to predict lifecycle efficiency of one or more devices over a plurality of use periods. In some embodiments, lifecycle efficiency predictions may be generated based on channel efficiency associated with one or more channels.

Non-Limiting Example Embodiments

In addition to the various embodiments disclosed herein, the following examples are provided for further understanding and appreciation of the inventions discussed herein. These examples are not intended to be limiting and may be implemented in whole or in part and alone or with any one or more other embodiments discussed herein.

Figure 11:
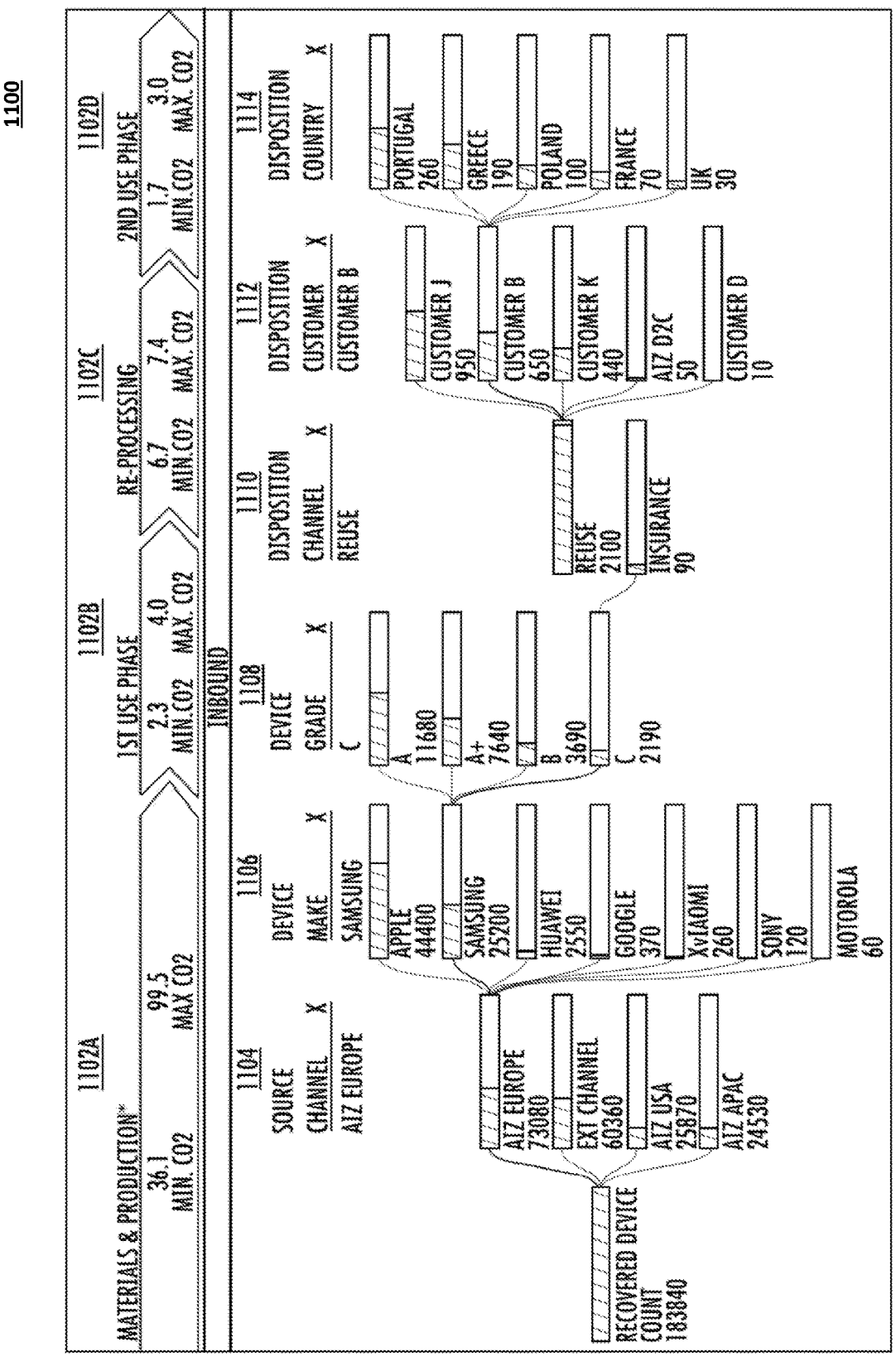
FIG. 11 illustrates an example graphical user interface configured to be rendered on a display of a client device depicting resource usage across device lifecycle for a plurality of devices.

In some embodiments, the model(s) may be configured to programmatically optimize resource usage data and/or lifecycle efficiency across a plurality of devices, such as combining resource usage for shared functions (e.g., reduced resource usage for co-processing with the same system, shared transmission channels, etc.). The model(s) may be configured to generate one or more reports or audits of a device lifecycle efficiency and/or resource usage (or portions thereof). For example, FIG. 11 depicts an example graphical user interface 1100 configured to be rendered on a display of a client device depicting resource usage across device lifecycle for a plurality of devices. As depicted in FIG. 11, the graphical user interface 1100 may display data regarding one or more lifecycle stages 1102-1102D, including, for example, minimum and maximum resource usage data 1104A-1104D associated with each of the lifecycle stages 1102-1102D with respect to a plurality of devices. As depicted in FIG. 11, graphical user interface 1100 may include inbound data regarding the plurality of devices, including, for example, data regarding source channel 1104, device make 1106, device grade 1108, disposition channel 1110, disposition customer 1112, and/or disposition country 1114.

Figure 12:
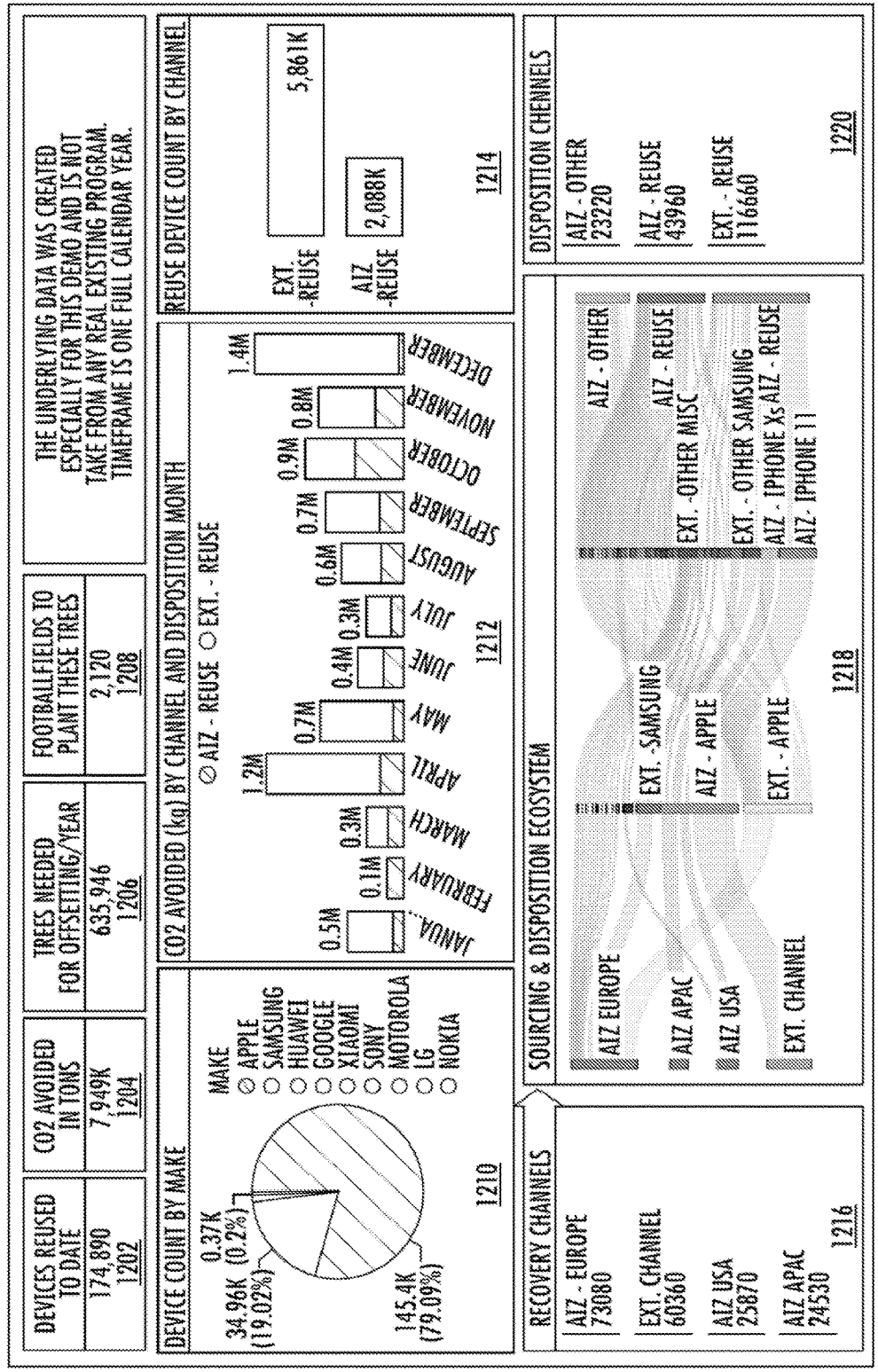
FIG. 12 illustrates an example graphical user interface configured to be rendered on a display of a client device depicting resource usage that has been avoided.

As another example, FIG. 12 depicts an example graphical user interface 1200 configured to be rendered on a display of a client device depicting the resource usage that has been avoided (e.g., net resource savings) from one or more various processes implemented according to the present disclosure. In some embodiments, the avoidance may be quantified and programmatically commoditized (e.g., by minting one or more electronic tokens associated with resource usage avoidance). As depicted in FIG. 12, the graphical user interface 1200 may display various data including, for example, repurposed device count data 1202 that describes a total number of devices whose life were extended based on resource usage data and/or lifecycle efficiency predictions, and may include net resource savings data 1204 that describes the net resource savings achieved as result of extending the life of these devices (e.g., reusing these devices). In some embodiments, the graphical interface 1200 may include context data 1206, 1208 that provides context with respect to the net resource savings. As further depicted in FIG. 12, in some embodiments, the graphical user interface 1200 may include segmented device count data 1210 (e.g., in the form of any suitable graphical representation) that breaks down the number of devices repurposed by make of the devices; per-channel net savings 1212 (e.g., in the form of any suitable graphical representation) that describes the net savings achieved per channel; and per-channel reused device count 1214 (e.g., in the form of any suitable graphical representation) that describes the reuse device count per channel. The graphical user interface may also include recovery channel data 1216, sourcing and disposition ecosystem data 1218; and disposition channel data 1220.

In some embodiments, the model(s) may be configured to determine an optimal solution (e.g., a repair) for a device based on the lifecycle efficiency prediction data and/or resource usage data. For example, both the lifespan impact metric and the resource usage data may be input into a model to determine the optimal solution to a defect that provides the greatest predicted lifecycle efficiency improvement.

In some embodiments, the model may consider a plurality of devices as alternative parts of a single flow. For example, a user is may be faced with the decision of whether to repair or replace their device (e.g., when fulfilling an insurance claim). In such instances, the resource usage of both the existing (repaired) device and a potential new (replacement) device must be considered, which may include modeling the second use period of the repaired device and/or modeling the initial use periods (e.g., manufacture through the first use period) and/or subsequent use periods (e.g., total lifecycle efficiency) of the replacement device.

In some embodiments, a claims fulfillment process may be used to direct a user towards an optimal solution and/or optimal resource usage/lifecycle efficiency by incentivizing (via modeling and one or more GUI prompts) a second use period of a device. For example, the model may be configured to generate a predicted value of the device to a user and offer an incentive that reduces the net fee collected in the short term to incentivize the customer to select the additional use period with a refurbished device (whether the customer's same device or a subsequently acquired, refurbished device) which results in a net resource usage optimization for the provider of the claims fulfillment process. Fulfillment systems and trade-in systems, such as those disclosed in U.S. Publication No. 2012/0252403 filed Mar. 30, 2012; and U.S. Pat. No. 10,726,454, filed Oct. 21, 2014. The foregoing patents and patent applications are hereby incorporated by reference herein in their entireties. In some embodiments, a kiosk or other physical computing apparatus may be accessible to a user for facilitating real-time receipt of a used device (e.g., a device following a first use phase) and/or reallocation of a new or used device to the user (e.g., a device that was repaired or refurbished as part of a device triage period)

Embodiments of the present disclosure may identify resource usage, such as for example, device carbon emissions at the device level (e.g., modeled to determine the resource usage of an individual device). Mobile devices are usually disposed after the first use period of around 2-3 years (Baseline). Embodiments of the present disclosure, provide insights that enable a second life (or more) for devices, which in turn decreases net resource usage due to extending the devices' life (use period). Furthermore, embodiments of the present disclosure provide for presenting customers (e.g., device owners) with information regarding resource savings, such as carbon savings, achieved or that may be achieved due to extending the life of a device associated with the customers. Accordingly, providing or equipping customers with valuable insights that enable customers to make decisions that facilitate optimization of resource usage, such as minimizing resource usage. Embodiments of the present disclosure provide one or more models (e.g., resource usage calculation model(s) and/or lifecycle efficiency prediction model(s)) and techniques to assess resource usage impact (such as carbon impact as a non-limiting example) of refurbished devices and insurance claims. Application of these models(s) and techniques may further facilitate certain technical downstream and upstream processes, such as those described herein. Furthermore, embodiments of the present disclosure may facilitate Environmental Social Governance reporting, diagnostics, fulfillment, logistics, and other technical analyses. Data from specific activities within an entities value chain (i.e. asking suppliers/customers for their emissions data) may enable performance tracking and benchmarking of individual value chain entities by allowing various entities to track operational changes from actions taken to optimize resource usage at individual facilities/companies and to distinguish between suppliers in the same sector based on resource usage performance, such as Greenhouse Gas (GHG) performance as one non-limiting example.

Embodiments of the present disclosure may generate, configure, train, and/or apply one or more models to generate resource usage data and/or lifecycle efficiency prediction data based on a broad range of data (e.g., input factors) that may include one or more of device IMEI, device make/model, percentage of resource usage associated with final disposition (e.g., end of life), percentage of resource usage associated with raw materials/production lifecycle stage, percentage of resource usage associated with transportation, percentage of resource usage associated with a use period, age/time period, assumptions, device full name, device manufacturer, geographical area, location of device, second use period flag, end date of second life, disposition purpose flag, resource usage apportionment, resource usage avoidance, resource usage avoidance with apportionment, resource usage injection total, resource usage trade-in total, device disposition count, device count (e.g., based on device IMEI) with apportionment, device injection count (e.g., based on device IMEI), device trade in, batch number, blended forecast total, budget device name, buyer type, credit total, customer, date of finished goods, date of receipt, MWC source, reprocessing total, device resource usage, first lifecycle resource usage, first use period resource usage, second life flag, second use period resource usage data, ancillary costs, date signed off, device cost, gross profit, overall data quality grade, device owner, first use period duration years (e.g., years), second use period resource usage, country, grid energy resource usage, annual average device energy consumption, annual use period resource usage, device brand, device model, device version, resource usage total associated with final disposition lifecycle stage (e.g., end of life), resource usage associated with raw material life cycle stage, resource usage associated with transportation lifecycle stage, resource usage associated with a use period, total device identifiers (e.g., total devices).

A subset (or all) of the data may be used to determine, identify generate, various data relevant for optimizing resource usage and/or lifecycle efficiency predictions, such as for example, determining resource usage data associated with a device; mapping make and/or model of a device; determining resource usage associated with a second lifecycle or flag a second lifecycle; mapping source country of the device; generating disposition master data; merging disposition master data; mapping ecosystem data; determining resource usage associated with a use period; determining device characteristics; mapping refurbishing solution; determining resource usage associated with a disposition purpose; generating a measure table (e.g., KPI table.); determining resource usage associated with a use period; generating a reuse master data; mapping shipping data; determine resource usage associated with a use period for a particular user; mapping resource usage associated with packaging; map resource usage associated with resource usage at a grid.

Resource usage data and/or lifecycle efficiency prediction data may be integrated into a larger technical infrastructure to make device diagnostic, repair, replacement, and/or logistics decisions. For example, in diagnosing a fault with a mobile device, the programmatically calculated solution may include a component that calculates the resource usage and/or lifecycle efficiency of each potential solution (e.g., either separately or converted to dollar cost of the solution).

By way of another example, various options within a particular solution or subsets of solutions may be chosen for their resource usage and/or lifecycle efficiency, such as shipping via a most carbon efficient means for the weight and type of part being used or sourcing parts/devices from more carbon friendly locations, or other resource usage minimizing metrics—including considering the full or partial upstream and downstream resource usage. For example, it may be more efficient to ship farther or more expensively for a replacement part if the part is sourced from a less resource intensive process and/or manufacturer. Similarly, a higher cost replacement part may be more expensive in the short term but may extend the useful lifespan of the device longer than a cheaper part. In some embodiments, a more costly device may be much more efficient and provide greater value in the long term in resource usage and/or lifespan. In some embodiments, broken mobile devices (e.g., devices subject to an insurance claim) may be swapped with a refurbished device to lower the resource usage and/or lifecycle efficiency of the claim. In some embodiments, resource usage and/or lifecycle efficiency may be tokenized and/or calculated using a uniform system of measurement to promote transferability and uniformity of calculation between multiple ecosystems.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for carbon optimized repair of a plurality of mobile devices, the system comprising a camera, at least one processor, and at least one non-transitory memory comprising instructions that, with the at least one processor, cause the system to:
    electrically connect with a mobile device;
    receive device data from the mobile device via the electronic connection, the device data comprising a device identifier;
    capture images of the mobile device using the camera;
    programmatically diagnose, using the at least one processor, at least one defect with the mobile device based on the device data and/or the images;
    identify a plurality of solutions for the at least one defect;
    apply the device identifier and information associated with the at least one defect to one or more models to generate lifecycle efficiency prediction data for the mobile device for the plurality of solutions for the at least one defect by applying predictive resource usage data for each solution for the at least one defect and device lifespan data associated with at least one subsequent use period of a plurality of use periods of the mobile device to the one or more models;
    select a carbon minimized solution of the plurality of solutions based on the lifecycle efficiency predictions, wherein the carbon minimized solution comprises a carbon consumption per unit time less than any other of the plurality of solutions;
    cause application of the carbon minimized solution to the mobile device to resolve the at least one defect by transmitting a signal configured to initiate replacement of at least one component of the mobile device with at least one replacement component;
    electronically associate the mobile device with a user; and
    cause one or more electronic signals configured to initiate transmission of the mobile device to the user.

2. The system of claim 1, wherein the at least one defect comprises an electronic fault determined via a diagnostic run on the mobile device, and is reported to the system through the electronic connection.

3. The system of claim 1, wherein programmatically diagnosing the at least one defect comprises analyzing the images to determine the at least one defect.

4. The system of claim 1, wherein the predictive resource usage data for each of the plurality of solutions for the at least one defect comprises a resource usage for the mobile device over the at least one subsequent use period for the respective solution.

5. The system of claim 1, wherein, the one or more models are configured to generate the lifecycle efficiency prediction data for each solution by:
    generating, a resource usage score for each solution based on the predictive resource usage data associated with the respective solution; and comparing the resource usage score for each solution with the device lifespan data.

6. The system of claim 1, wherein the device lifespan data comprises a lifespan impact metric data object for each of the plurality of solutions for the at least one defect.

7. The system of claim 1, wherein the one or more models are configured to generate each lifecycle efficiency prediction data for each solution by generating and programmatically assembling one or more lifecycle efficiency prediction segments for one or more of a plurality of segments of device data associated with the mobile device.

8. The system of claim 1, wherein the one or more models are machine learning models trained using aggregated device data sets from a plurality of devices comprising two or more different devices.

9. The system of claim 1, wherein selecting the carbon minimized solution comprises:
programmatically ranking the plurality of solutions based on the lifecycle efficiency prediction data associated with each solution of the plurality of solutions for the at least one defect.

10. The system of claim 1, wherein selecting the carbon minimized solution comprises:
receiving user input indicative of the carbon minimized solution based on the lifecycle efficiency predictions; and
programmatically selecting the carbon minimized solution.

11. The system of claim 1, wherein the instructions, with the at least one processor, further cause the system to: generate a control signal causing a renderable data object comprising one or more of the predictive resource usage data, the device lifespan data, or the lifecycle efficiency prediction data for one or more of the plurality of solutions to be displayed on a user interface of a client device.

12. A computer-implemented method for carbon optimized repair of a plurality of mobile devices, the method comprising:
electrically connecting with a mobile device;
receiving device data from the mobile device via the electronic connection, the device data comprising a device identifier;
capturing images of the mobile device;
programmatically diagnosing at least one defect with the mobile device based on the device data and/or the images;
identifying a plurality of solutions for the at least one defect;
applying the device identifier and information associated with the at least one defect to one or more models to generate lifecycle efficiency prediction data for the mobile device for the plurality of solutions for the at least one defect by applying predictive resource usage data for each solution for the at least one defect and device lifespan data associated with at least one subsequent use period of a plurality of use periods of the mobile device to the one or more models;
selecting a carbon minimized solution of the plurality of solutions based on the lifecycle efficiency predictions, wherein the carbon minimized solution comprises a carbon consumption per unit time less than any other of the plurality of solutions;
causing application of the carbon minimized solution to the mobile device to resolve the at least one defect by transmitting a signal configured to initiate replacement of at least one component of the mobile device with at least one replacement component;

electronically associating the mobile device with a user; and
causing one or more electronic signals configured to initiate transmission of the mobile device to the user.

13. The computer-implemented method of claim 12, wherein the at least one defect comprises an electronic fault determined via a diagnostic run on the mobile device, and is reported to a system through the electronic connection.

14. The computer-implemented method of claim 12, wherein
programmatically diagnosing the at least one defect comprises analyzing the images to determine the at least one defect.

15. The computer-implemented method of claim 12, wherein the predictive resource usage data for each of the plurality of solutions for the at least one defect comprises a resource usage for the mobile device over the at least one subsequent use period for the respective solution.

16. The computer-implemented method of claim 12, wherein, the one or more models are configured to generate the lifecycle efficiency prediction data for each solution by:
generating, a resource usage score for each solution based on the predictive resource usage data associated with the respective solution; and
comparing the resource usage score for each solution with the device lifespan data.

17. The computer-implemented method of claim 12, wherein the device lifespan data comprises a lifespan impact metric data object for each of the plurality of solutions for the at least one defect.

18. The computer-implemented method of claim 12, wherein the one or more models are configured to generate each lifecycle efficiency prediction data for each solution by generating and programmatically assembling one or more lifecycle efficiency prediction segments for one or more of a plurality of segments of device data associated with the mobile device.

19. The computer-implemented method of claim 12, wherein the one or more models are machine learning models trained using aggregated device data sets from a plurality of devices comprising two or more different devices.

20. At least one non-transitory computer readable medium having computer coded instructions configured to, when executed by at least one processor:
electrically connect with a mobile device;
receive device data from the mobile device via the electronic connection, the device data comprising a device identifier;
capture images of the mobile device using a camera;
programmatically diagnose, using the at least one processor, at least one defect with the mobile device based on the device data and/or the images;
identify a plurality of solutions for the at least one defect;
apply the device identifier and information associated with the at least one defect to one or more models to generate lifecycle efficiency prediction data for the mobile device for the plurality of solutions for the at least one defect by applying predictive resource usage data for each solution for the at least one defect and device lifespan data associated with at least one subsequent use period of a plurality of use periods of the mobile device to the one or more models;
select a carbon minimized solution of the plurality of solutions based on the lifecycle efficiency predictions, wherein the carbon minimized solution comprises a carbon consumption per unit time less than any other of the plurality of solutions;

cause application of the carbon minimized solution to the mobile device to resolve the at least one defect by transmitting a signal configured to initiate replacement of at least one component of the mobile device with at least one replacement component;

electronically associate the mobile device with a user; and cause one or more electronic signals configured to initiate transmission of the mobile device to the user.

\* \* \* \* \*